US008082175B2

(12) United States Patent
Rosenberg et al.

(10) Patent No.: US 8,082,175 B2
(45) Date of Patent: Dec. 20, 2011

(54) SYSTEM AND METHOD FOR OPTIMIZATION OF A PROMOTION PLAN

(75) Inventors: Adam N. Rosenberg, Scottsdale, AZ (US); James A. Sills, Scottsdale, AZ (US)

(73) Assignee: SAP AG, Walldorf (DE)

( * ) Notice: Subject to any disclaimer, the term of this patent is extended or adjusted under 35 U.S.C. 154(b) by 1263 days.

(21) Appl. No.: 11/509,344

(22) Filed: Aug. 24, 2006

(65) Prior Publication Data
US 2008/0065463 A1  Mar. 13, 2008

(51) Int. Cl.
*G06F 9/44* (2006.01)
(52) U.S. Cl. .................................. 705/14.43; 705/14.48
(58) Field of Classification Search .............. 705/14.43, 705/14.48
See application file for complete search history.

(56) References Cited

U.S. PATENT DOCUMENTS

| | | | | |
|---|---|---|---|---|
| 6,029,139 | A * | 2/2000 | Cunningham et al. | 705/10 |
| 6,553,352 | B2 | 4/2003 | Delurgio et al. | |
| 6,847,934 | B1 * | 1/2005 | Lin et al. | 705/10 |
| 7,072,848 | B2 | 7/2006 | Boyd et al. | |
| 7,287,000 | B2 * | 10/2007 | Boyd et al. | 705/14.43 |
| 2002/0169654 | A1 * | 11/2002 | Santos et al. | 705/10 |
| 2003/0050828 | A1 * | 3/2003 | Hoffman et al. | 705/11 |
| 2003/0110072 | A1 * | 6/2003 | Delurgio et al. | 705/10 |
| 2005/0096963 | A1 * | 5/2005 | Myr et al. | 705/10 |
| 2005/0256778 | A1 * | 11/2005 | Boyd et al. | 705/26 |
| 2006/0074749 | A1 * | 4/2006 | Kline et al. | 705/14 |
| 2006/0116830 | A1 * | 6/2006 | Shan | 702/60 |
| 2007/0288302 | A1 * | 12/2007 | Singh et al. | 705/10 |

OTHER PUBLICATIONS

"A Decision Support System for Planning Manufacturers' Sales Promotion Calendars", by Jorge Silva-Risso, Randolph Bucklin, and Donald Morrison, Marketing Science, vol. 18, No. 3, pp. 274-300, 1999.*
"Profit Maximizing Perceptual positions", by John Hauser and Patricia Simmie, the Institute of Management Sciences, vol. 27, No. 1, Jan. 1981.*

* cited by examiner

*Primary Examiner* — Lynda Jasmin
*Assistant Examiner* — Pan Choy
(74) *Attorney, Agent, or Firm* — Buckley, Maschoff & Talwalkar LLC

(57) ABSTRACT

A method (400) and system (100) for providing a promotion plan (128) for merchandising products (600) receives base data (142) for the products (600) that includes allowable offers (204) and price rules (206) that affect the offers (204). A margin budget (146) is established for the promotion plan (128) that defines an amount of margin an enterprise is willing to forgo for a promotion event implementing the promotion plan (128). A scenario (406) is generated in response to the base data (142). The scenario (406) is optimized to obtain decisions (154) for the promotion plan (128) that are constrained by the margin budget (146). The promotion plan (128), indicating the obtained decisions (154), is presented for implementation by the enterprise during the promotion event. The obtained decisions (154) include a list of the products (600), each of which is associated with one offer (204) and one price rule (206).

22 Claims, 18 Drawing Sheets

FIG. 2

| OFFER | PRICE RULES |
|---|---|
| DISCOUNT PERCENT | LIST OF ALLOWABLE PERCENT OFF RULES (EX. 10%, 20%, 30%, ETC.) |
| DISCOUNT AMOUNT | LIST OF ALLOWABLE AMOUNT OFF RULES (EX. $.20, $.40, $.60, ETC.) |
| DISCOUNT PRICE | LIST OF ALLOWABLE PRICE SETTINGS (EX. $1.29, $1.39, $1.49, ETC.) |
| BUY ONE GET ONE (BOGO) | ONLY ONE PRICE RULE, I.E., TWO FOR HALF PRICE |
| EVERY DAY LOW PRICE (EDLP) | ONLY ONE PRICE RULE, I.E., REGULAR PRICE (WITH PROMOTION LIFT) |
| BUY M FOR ONE PRICE AND GET N FOR ANOTHER PRICE | TWO NUMBER PARAMETERS (M AND N) AND TWO PRICES |

FIG. 6

| PRODUCT | PROMOTION CHOICE | | PROFIT | REVENUE | UNIT SALES |
|---|---|---|---|---|---|
| | OFFER | PRICE RULE | | | |
| A | DISC. % | 10% | | | |
| | | 20% | | | |
| | | 30% | | | |
| | DISC. AMOUNT | $0.20 | | | |
| | | $0.30 | | | |
| B | | | | | |
| ... | | | | | |

FIG. 7

DEMAND MODEL $$D(t) = TDD(t)e^{q_0 - \beta p + v_c}$$

WHERE:
- $D(t)$ = UNIT SALES AT TIME t,
- $p$ = PRICE,
- $TDD(t)$ = TIME DEPENDENT DEMAND FACTOR,
- $q_0$ = SCALE FACTOR OF DEMAND CURVE,
- $\beta$ = DEMAND ELASTICITY PARAMETER, AND
- $v_c$ = LIFT FOR PROMOTION c, 0 FOR REGULAR PRICE TOTAL DEMAND, D, IS MODELED AS A FUNCTION OF A PRICE, p, CONSTANT OVER TIME:

$$D = Qe^{-\beta p + v_c}$$

WHERE:
$$Q = e^{q_0} \sum_t TDD(t)$$

| PRODUCT | FIRST EXTREME POINT 1202 | | SLOPE ΔY/ΔX = λ (arriving at extreme point) |
|---|---|---|---|
| | REVENUE (x) $ | PROFIT (y) $ | |
| A | 3000.00 | 1000.00 | 0 |
| | 3200.00 | 880.00 | -0.6 |
| | 3225.00 | 860.00 | -0.8 |
| | 8000.00 | 500.00 | -0.075 |
| B | ... | | |
| ... | | | |
| C | | | |
| ... | | | |

↑ 600  ↑ 608  ↑ 606  ↑ 1204   1200

PROFIT/REVENUE FRONTIER FOR PRODUCT A — 600

1300

| GLOBAL EXTREME POINTS (PROFIT VS. REVENUE) 1402 | | SLOPE λ (pure profit/revenue) |
|---|---|---|
| REVENUE (X) | PROFIT (Y) | |
| 23,000 | 7500 | 0 |
| 26,000 | 7488 | -0.002 |
| 32,000 | 7440 | -0.006 |
| 54,000 | 6340 | -0.05 |
| ... | | |

1408 → 23,000 row; 1410 → 26,000 row; 1406 ↑ REVENUE(X); 1404 ↑ PROFIT(Y); 1204 ↑ SLOPE

1400

PROFIT/REVENUE GLOBAL FRONTIER, a=0

1500

| PRODUCT | EXTREME POINT | | SLOPE $\Delta Y/\Delta X = \lambda$ (arriving at extreme point) |
|---|---|---|---|
| | UNIT SALES (x) | PROFIT (y) $ | |
| A | 15,000 | 2500.00 | 0 |
| | 17,000 | 2300.00 | -0.01 |
| | 25,000 | 1500.00 | -0.1 |
| | 27,500 | 1200.00 | -0.12 |
| B | ... | | |
| ... | | | |
| C | | | |
| ... | | | |

↑600  ↑610  ↑606  ↑1604
1600

PROFIT/UNIT SALES FRONTIER FOR PRODUCT A

| STRATEGY | SOLUTION | EXTREME POINTS | | | λ | a |
| --- | --- | --- | --- | --- | --- | --- |
| | | PROFIT | REVENUE | UNIT SALES | | |
| P | S1 | 4008.25 | 6108.00 | 828.5 | .002 | 0 |
| R | S2 | 3747.00 | 6353.69 | 1071.8 | .008 | 0 |
| US | S3 | 2190.58 | 5677.84 | 1501.8 | .065 | 1 |
| P-R | S4 | ... | ... | ... | ... | ... |
| R-P | S5 | | | | | |
| P-US | S6 | | | | | |
| US-P | S7 | | | | | |
| R-US | S8 | | | | | |
| US-R | S9 | | | | | |
| P-R-US | S10 | | | | | |
| P-US-R | S11 | | | | | |
| R-P-US | S12 | | | | | |
| R-US-P | S13 | | | | | |
| US-P-R | S14 | | | | | |
| US-R-P | S15 | | | | | |

FIG. 24

| 1ST STRATEGY | 2ND STRATEGY | TEST VALUE |
|---|---|---|
| R-P | R | P |
| US-P | US | P |
| P-R-US | US-R-P | P |
| P-US-R | R-US-P | P |
| P-R | R-P | P |
| P-US | US-P | P |
| P-R-US | R-P-US | P |
| P-US-R | US-P-R | P |
| R-P | P-R | P |
| US-P | P-US | P |
| R-US-P | US-R | P |
| US-RE-P | R-US | P |
| R-P-US | R-US-P | P |
| US-P-R | US-R-P | P |

↑ 2402  ↑ 2404  ↑ 2406

2408

| 1ST STRATEGY | 2ND STRATEGY | TEST VALUE |
|---|---|---|
| P-R | P | R |
| US-R | US | R |
| R-US-P | P-US-R | R |
| R-P-US | US-P-R | R |
| R-P | P-R | R |
| R-US | US-R | R |
| R-US-P | US-R-P | R |
| R-P-US | P-R-US | R |
| P-R | P-US | R |
| US-RE | US-P | R |
| P-US-R | P-US | R |
| P-US-R | US-P | R |
| P-US-R | P-US-R | R |
| US-P-R | US-P-R | R |

↑ 2402  ↑ 2404  ↑ 2406

| 1ST STRATEGY | 2ND STRATEGY | TEST VALUE |
|---|---|---|
| P-US | P | US |
| R-US | R | US |
| US-P-R | R-P-US | US |
| US-R-P | P-R-US | US |
| US-P | P-US | US |
| US-R | R-US | US |
| P-US | P-R | US |
| R-US | R-P | US |
| US-P-R | P-US-R | US |
| US-R-P | R-US-P | US |
| P-R-US | P-R | US |
| R-US-P | R-P-US | US |

↑ 2402  ↑ 2404  ↑ 2406

2400

SYSTEM AND METHOD FOR OPTIMIZATION OF A PROMOTION PLAN

TECHNICAL FIELD OF THE INVENTION

The present invention relates to the field of promotion optimization. More specifically, the present invention relates to optimizing a promotion plan that takes into account a user defined promotion strategy and promotion constraints.

BACKGROUND OF THE INVENTION

Enterprises commonly employ promotional techniques to improve profits, revenues, sales volumes, and the like. Promotion events are actions an enterprise might take to get consumers to buy products. For instance, an enterprise may adjust prices as needed to encourage sales of particular products. Alternatively, or in addition to price adjustments, an enterprise may specially present or advertise its products to increase consumer awareness and demand. Because of the variety of promotion discounts often applied at any one time, the complexity of the market, regional variance in sales, and difficulties in understanding customer response, it is usually very difficult to plan promotion events and pricing adjustments to meet enterprise-specific objectives. Another problem arises with the difficulty of accurately forecasting effectiveness of various promotional tools and price adjustments, and evaluating the influence of each promotional event on the overall enterprise objectives.

Generating promotion plans and predicting the consequences of various pricing and promotion strategies, especially when faced with an astronomical number of products and combinations, is beyond the capabilities of the unaided human mind. A particular problem faced by a user making promotion and pricing decisions includes, for example, the estimated optimal values of prices for selected products may be incompatible with overall enterprise objectives, such as improving revenues, profits, sales volumes, and such. Therefore, such promotion and pricing decisions are unacceptable.

A number of techniques and computerized systems have been developed for optimizing promotion decisions. However, some of these techniques and systems cannot efficiently process the astronomical number of products and combinations to arrive at an optimal promotion plan and forecast demand in response to the promotion plan. Moreover, these techniques cannot adequately account for the variations in product pricing across a variety of stores of an enterprise when determining an optimal promotion plan. Another problem with the prior art is that a user cannot make promotion and pricing decisions based one or more objectives of the enterprise, and vary those promotion and pricing decisions based on a relative weight of realizing those objectives.

SUMMARY OF THE INVENTION

Accordingly, it is an advantage of the present invention that a system and method for optimization of a promotion plan are provided.

It is another advantage of the present invention that a system and method are provided that can accomplish enterprise-scale optimization to arrive at an optimal promotion plan within reasonable computer processing time limits.

Another advantage of the present invention is that a system and method are provided that can make promotion and pricing decisions based on a relative weight of realizing one or more objectives of the enterprise.

The above and other advantages of the present invention are carried out in one form by a method of providing a promotion plan for merchandising of products for sale by an enterprise. The method entails receiving base data for the products, the base data including allowable offers for the products and price rules that affect the offers. A margin budget is established for the promotion plan, the margin budget defining an amount of margin the enterprise is willing to forgo for a promotion event implementing the promotion plan. A scenario is generated for the promotion plan in response to the base data, and the scenario is optimized to obtain decisions for the promotion plan, the decisions being constrained by the margin budget. The promotion plan indicating the obtained decisions is presented for implementation by the enterprise during the promotion event. The obtained decisions include a list of the products, each of the products in the list being associated with one of the offers and one of the price rules.

The above and other advantages of the present invention are carried out in another form by a system for providing a promotion plan for merchandising of products for sale by an enterprise. The system includes an input for receiving base data for the products, a margin budget, and a promotion strategy from a user. The base data includes allowable offers for the products and price rules that affect the offers. The margin budget defines an amount of margin the enterprise is willing to forgo for a promotion event implementing the promotion plan. A scenario generator is in communication with the input for acquiring the base data, the budget margin, and the promotion strategy to generate a scenario for the promotion plan. An optimization engine, in communication with the scenario generator, is configured to identify promotion choices of the allowable offers as affected by the price rules, model market demand for each of the products to receive demand outcomes responsive to the promotion choices, and utilize the demand outcomes to obtain decisions for the promotion plan in accordance with the promotion strategy, the decisions being constrained by said margin budget. The system further includes an output for presenting the promotion plan indicating the obtained decisions for implementation by the enterprise during the promotion event, the obtained decisions including a list of the products. Each of the products in the list is associated with one of the offers and one of the price rules.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 shows a table of exemplary promotion choices that may be implemented during a promotion event;

FIG. 6 shows a table of a demand outcome database;

FIG. 7 shows a table depicting a demand model 122;

FIG. 23 shows a table of fifteen strategy solutions for each of promotion strategy obtained the from frontier surface of FIG. 17; and FIG. 24 shows a table utilized to test the consistency of the strategy solutions of FIG. 23.

DETAILED DESCRIPTION OF THE PREFERRED EMBODIMENTS

Figure 1:
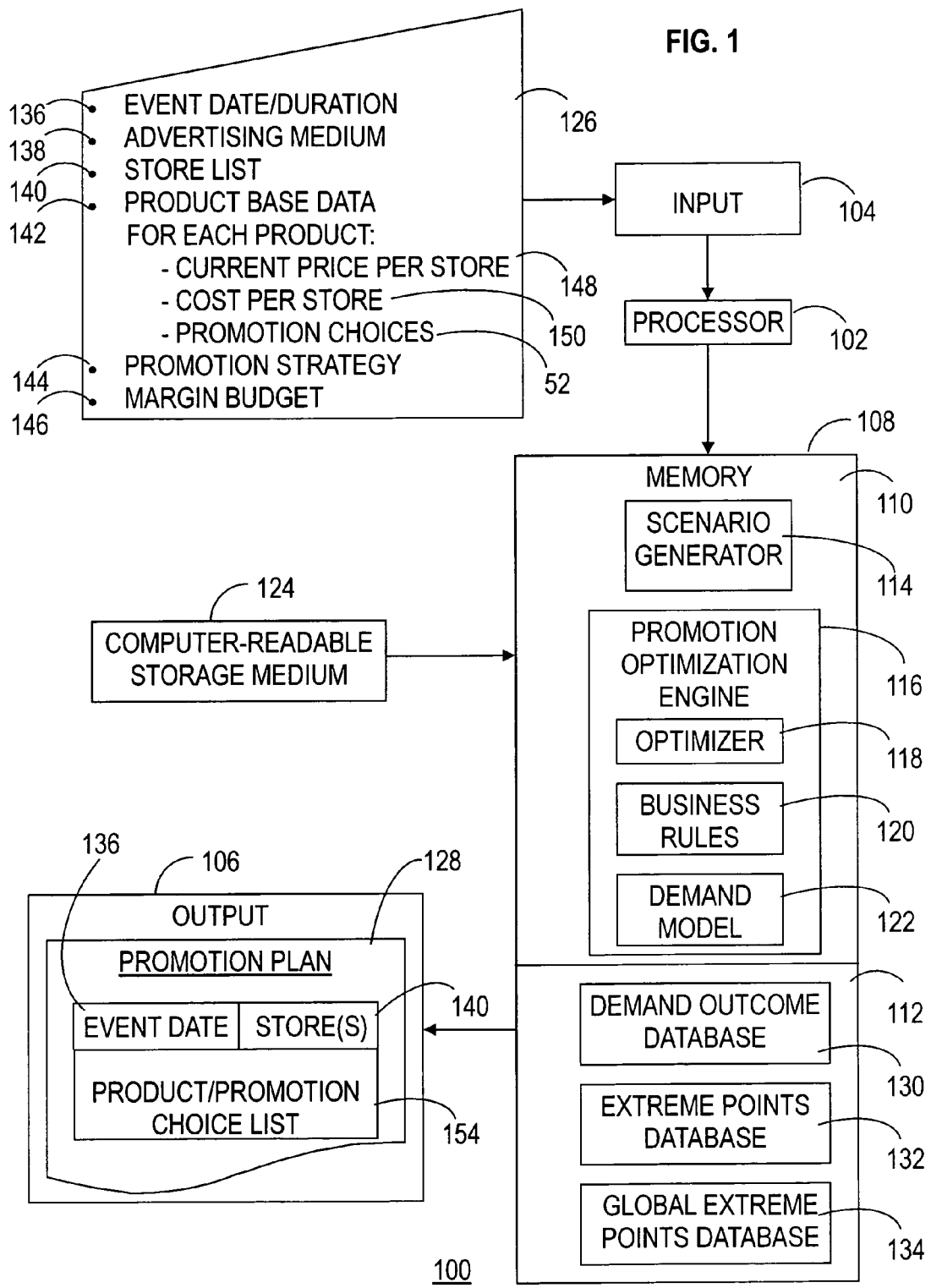
FIG. 1 shows a block diagram of an exemplary computing environment within which the method of the present invention may be practiced.

The following is a glossary of terms used herein:

Enterprise: Any public, private, or governmental organization that provides products to be consumed by others, whether or not for profit. Presumably, an enterprise competes with other enterprises for the attention of customers and potential customers.

Products: Are items in the form of individual goods, a collection of goods (i.e., an ad group), services, or a combination of goods and services. Products are considered to be consumed within the present context when physically and/or legally transferred to the customer, such as when a transaction occurs.

Promotion: An action a retailer takes to get shoppers to buy products. A promotion can be an action other than reducing the price or in addition to reducing the price.

Promotion Event: An instance, bounded by time, of a promotion, i.e., a collection of products with associated promotion rules, set of stores, and time interval. A promotion event has global rules describing an event strategy and promotion product selection.

Medium: A vehicle used to convey advertising messages to an audience. The medium may be print, radio, store signage, or prominent placement.

Promotion Strategy: Is the fundamental underpinning of a promotion plan designed to reach particular objectives, these objectives having measurable results. In the invention, the promotion strategy can be determined by a rank ordering of some or all of three objectives: Profit Objective, Revenue Objective, and Unit Sales Objective.

Profit Objective: Attempt to realize the maximum profit (trying to make money).

Profit: The net gain from an activity. The excess of revenues over outlays in a given period of time (including depreciation and other non-cash expenses). Example: (Selling price minus cost price) times quantity of units sold.

Revenue Objective: Attempt to realize the maximum revenue without regard for cost.

Revenue: The entire amount of income before any deductions are made, i.e., price times quantity sold (trying to generate business).

Unit Sales Objective: Attempt to realize the maximum number of units sold without regard to price or cost.

Unit Sales: Sales measured in terms of physical units rather than dollars (trying to increase customer count).

Unit Cost: Calculated cost for a given unit of a product. Unit cost can include the real costs incurred to purchase, store, distribute, stock, and sell a particular product.

Promotional Lift: Demand increase due to promotion activity.

Category Manager: One who is responsible for marketing a category of relating products within a chain of stores.

Demand: Is the quantity of a product that consumers are willing to purchase and have the capacity to buy at the given price and promotion per unit of time.

Model: Is a representation of a system that allows for investigation of the properties of the system and prediction of future outcomes.

Demand Model: Describes the relationship between one or more merchandising levers (product price, promotion, location in store, logistics/inventory, and assortment) and consumer demand for a group of products.

Global Rules: Describe a promotion event strategy and promotion product selection.

Promotion Choices: Are rules for each product. These rules encompass a range of offers and prices i.e., what kinds of offers are allowed for each product and what price rules govern each kind of offer.

Offer: A proposal to enter into certain arrangements. In accordance with the present invention, an offer indicates a particular promotion type, such as percent off, amount off, discount price, and so forth.

Price Rule: Rule or rules that governs an offer.

Ad group: A collection of products grouped together with a common offer and price rule.

(Gross) Margin: Expresses the relationship between gross profit and sales revenue. It can be expressed in absolute terms or as a ratio of gross profit to sales revenue, usually in the form of a percentage (i.e. Gross Margin Percentage=100*(Revenue−Cost of goods Sold)/Revenue). Use of the term "Margin" in the present invention refers to the Gross Margin percentage, i.e. Profit/Revenue. Gross Margin directly tells a user how many of the sale dollars are profit. Example: Product cost of $100 and selling price of $150 yields a 33% margin, i.e., 100*(150−100)/150=33%.

Margin lower limit: A minimum allowable amount of profit to be gained on the sale of a product.

Margin Budget: (in accordance with the present invention) Is the amount of margin, relative to regular price, that the retailer is willing to forgo for a promotion event. Consequently, margin budget equals margin (at regular price) minus the margin lower limit.

Those skilled in the art will appreciate that managers of an enterprise desire to understand and achieve the objectives of the enterprise. However, managers typically do not wish merely to realize a single objective, such as maximum profit, revenue, and or unit sales, but may additionally wish to realize multiple objectives of the enterprise. Moreover, these managers may wish to realize multiple objectives of the enterprise during a promotion event. The preferred embodiments of the present invention provide a useful tool for computing decisions for a promotion plan, those decisions including a list of products (individual goods, ad groups, and/or services) to be included in the promotion plan as well as associated offers and price rules that affect the offers. Moreover, the present invention enables the economically efficient computation of decisions, while taking into account the relationship between the objectives of an enterprise and user determined promotion constraints.

The present invention constrains optimization of the promotion plan by the margin budget, i.e., the amount of margin, relative to regular price, that the retailer is willing to forgo for a promotion event. Use of a margin budget avoids the ambiguity of whatever technique the enterprise uses for accounting. For example, some enterprises use product price and cost to compute margin, whereas other enterprises may take other factors into account (storage, shrinkage, etc.) to arrive at a different number for the original cost.

In the following discussion relating to FIGS. 1-24, each Figure's reference numerals are keyed-in to its respective Figure number, i.e., FIG. 1 has reference numerals in the 100's, FIG. 2 has reference numerals in the 200's, and so forth.

FIG. 1

FIG. 1 shows a block diagram of an exemplary computing environment 100 within which the method of the present invention may be practiced. FIG. 1 depicts a processor section 102 in communication with an input section 104, an output section 106, and memory 108. Nothing prevents processor section 102, input section 104, output section 106, and/or memory 108 from including numerous subsections that may or may not be located near each other. Thus, computing environment 100 may be provided by any of a vast number of general or special purpose computers and/or computer networks.

Memory 108 represents any manner of computer-readable media, including both primary memory (e.g., semiconductor devices with higher data transfer rates) and secondary memory (e.g., semiconductor, magnetic, and/or optical storage devices with lower data transfer rates). Input section 104 represents any manner of input elements (i.e., a keyboard, mouse, etc.) and output section 106 represents any manner of output elements (i.e., monitors, printers, etc.). Data and computer programs may be transferred in to or out from memory 108 through input and output sections 104 and 106, respectively.

Memory 108 is depicted as having a code section 110 and a data section 112. Those skilled in the art will appreciate that any distinction between sections 110 and 112 may be due merely to different types of data and need not be due to physically different types of memory devices. Code section 110 stores any number of the types of computer programs typically found on computers and/or computer networks. In addition, code section 110 includes a scenario generator 114 and a promotion optimization engine 116 that may be partitioned into an optimizer code segment 118, a business rules code segment 120, and a demand model code segment 122.

Prior to being transferred to memory 108, scenario generator 114 and a promotion optimization engine 116 may have resided on a computer-readable medium 124. Computer-readable medium 124 represents any location or storage device from which computer programs may be accessed, including remote servers, CD ROMs, and the like. Scenario generator 114 and a promotion optimization engine 116, and code segments 118, 120, and 122 thereof, provide computer software that instructs processor section 102 how to receive and manipulate a plurality of data inputs 126 via input section 104. The computer software further instructs processor section 102 to generate a promotion plan 128 for a promotion event in response to data inputs 126 and instructs processor section 102 to output promotion plan 126 via output section 106. Data products that may be created and stored in data section 112 through the execution of promotion optimization engine 116 include a demand outcome database 130, and extreme points database 132, and a global extreme points database 134, all of which will be discussed in greater detail below.

Data inputs 126 may include one or more of the following, a promotion event date/duration 136, an advertising medium 138, a store list 140 of stores at which the promotion event is to occur, product base data 142, a promotion strategy 144, and a margin budget 146. Product base data 142 may include for each product, a current price per store 148, a unit cost per store 150, and promotion choices 152. Promotion plan 128 includes, for example, promotion event date/duration 136, store list 140, and optimization decisions, in the form of a product/promotion choice list 150, determined through the execution of scenario generator 114 and promotion optimization engine 116.

Business rules code segment 120 defines the operations, definitions and constraints that apply to the enterprise in achieving its objectives. For example, business rules code segment 120 allows a choice of offer types for each product. The offer may be made to all shoppers or to a qualified shopper community such as a store club card or membership in a particular club. Some of the offer types have a selection of price rules that affect the offers. Offers and price rules will be discussed in greater detail in connection with FIG. 2.

Business rules code segment 120 may also allow for promotion optimization engine 116 to operate in a particular mode. Pertinent to the present invention two operating modes include 1) the user selects products and stores, and optimization engine 116 chooses offers and price rules, and 2) client selects products and stores and optimization engine 116 chooses a subset of the products, offers, and price rules.

Business rules code segment 120 may further define required common promotion rules. These common promotion rules may indicate that each product promoted in a promotion event is promoted with the same offer and price rule in every store. In addition, to be considered for optimization, prices must be valid for every store in the promotion event. For example, if one store has a regular price of $3.49 for a product while all the others in the promotion event have a regular price of $4.95, then a $4.00 discount is not considered a valid choice for that product. Other common promotion rules may specify that collections of products, i.e., ad groups, are to be kept together with a common offer and price rule. For example, all flavors of one brand of yogurt have the same offer and price rule.

FIG. 2

FIG. 2 shows a table 200 of exemplary promotion choices 202 that may be implemented during a promotion event. A promotion choice 202 includes an offer 204 and a price rule 206 that affects offer 204. An optimal promotion choice 202 determined through the execution of promotion optimization engine 116 yields one offer 204 and one price rule 206 per product or ad group.

Some offers 204 have a selection of price rules. For example, an offer 204 of "Discount Percent" includes a list of price rules 206, for example 10%, 20%, 30%, and so forth. Price rules 206 for "Discount Percent" offer 204 define a number of allowable percent-off values. Price rules 206 for "Discount Amount" offer 204 define a list of discount amounts, for example, $0.20, $0.40, $0.60, and so forth. Price rules 206 for "Discount Price" offer 204 define a list of allowable price settings, for example, $1.29, $1.39, $1.49, and so forth. Global parameters may be implemented to restrict prices for "Discount Amount" offer 204 and "Discount Price" offer 204 to a prescribed percentage range of regular price so that optimization does not inadvertently take too large or small of an amount off.

Table 200 further illustrates offers 204 that may only have one associated price rule 206, For example, "Buy One Get One Free" offer 204 has one associated price rule 206, i.e., two for half price. Similarly, "Every Day Low Price" offer 204 has one associated price rule 206, i.e., regular price (with promotional lift). "Buy M for One Price and Get N for Another Price" offer 204 has two number parameters (M and N) and two prices. The aforementioned offers 204 and price rules 206 were presented for illustrative purposes. Other offers 204 can be added to table 200. One exemplary offer 204 includes another product as motivation for purchase, such as a "meal deal" that bundles a food choice and a drink choice together for a reduced price.

FIG. 3

Figure 3:
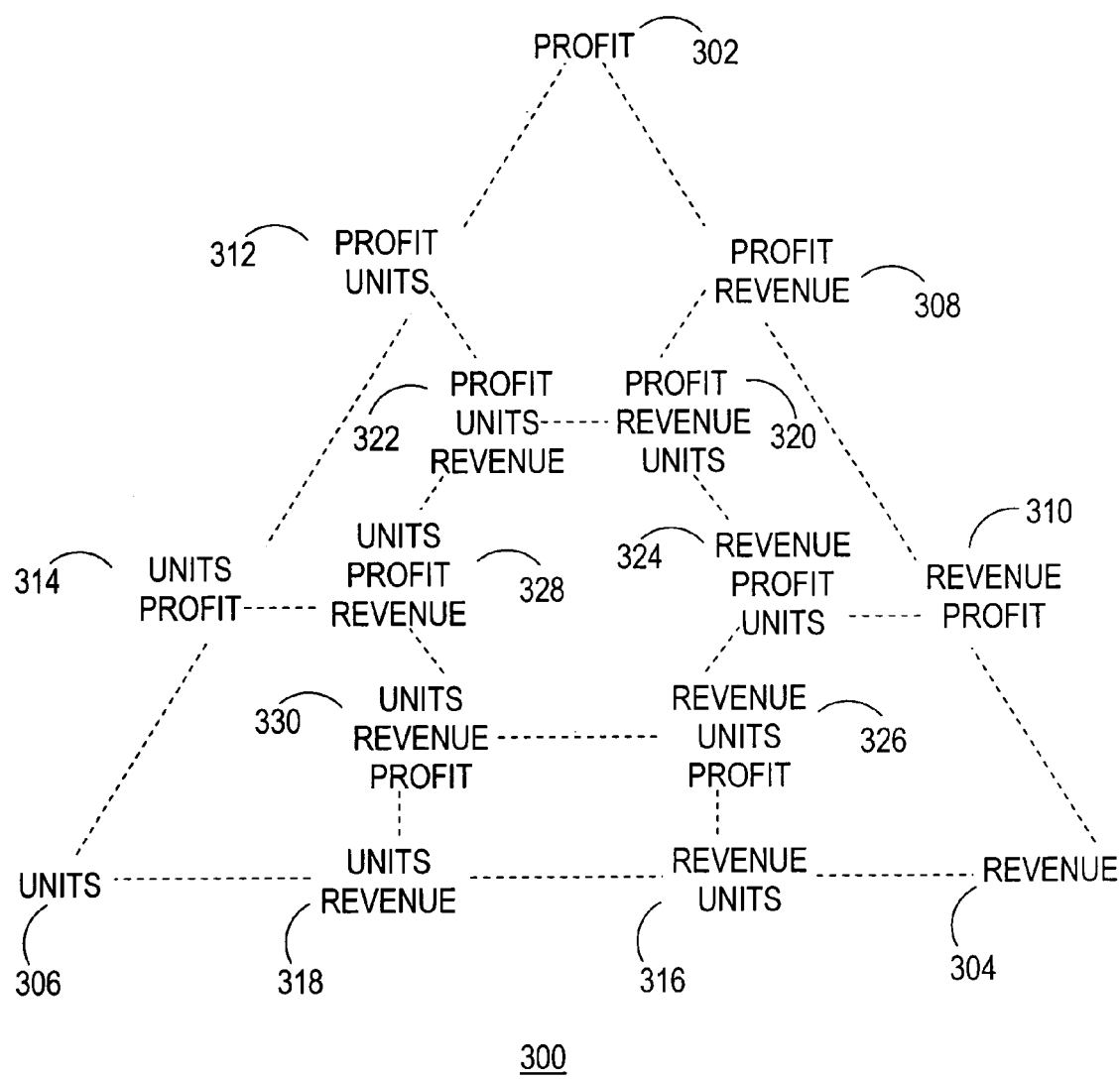
FIG. 3 shows an illustration of promotion event strategies in terms of three objectives of an enterprise.

FIG. 3 shows an illustration of a strategy triangle of promotion strategies 300 in terms of three objectives of an enterprise. These three objectives include a profit objective, a revenue objective, and a unit sales objective. In accordance with a preferred embodiment of the present invention, fifteen promotion strategies 300 define a space of strategy choices for optimizing a promotion event. This space of strategy choices is represented by the strategy triangle that characterizes a ranking, or hierarchy, of the one or more objectives within each of promotion strategies 300. Promotion plan 128 is created in response to a user selected one of promotion strategies 300.

Three of promotion strategies 300 are single objective strategies located at the vertices of the strategy triangle. These include a pure-profit strategy 302, a pure-revenue strategy 304, and a pure-unit sales strategy 306. Six of promotion strategies 300 are two-objective promotion strategies 300 located on the sides of the strategy triangle. These include a profit-revenue strategy 308, a revenue-profit strategy 310, a profit-unit sales strategy 312, a unit sales-profit strategy 314, a revenue-unit sales strategy 316, and a unit sales-revenue strategy 318.

The interior of the strategy triangle is populated with three-objective promotion strategies 300. These include a profit-revenue-unit sales strategy 320, a profit-unit sales-revenue strategy 322, a revenue-profit-unit sales strategy 324, a revenue-unit sales-profit strategy 326, a unit sales-profit-revenue strategy 328, and a unit sales-revenue-profit strategy 330.

In general, for pure-profit strategy 302, the profit objective is achieved by finding the most profitable products, offers, and price rules for a promotion event. If the most profitable choices of products, offers, and prices does not meet margin budget 146, then promotion optimization engine 116 allows regular price as one of promotion choices 202 and finds a strategy solution within margin budget.

Similarly, for pure-revenue strategy 304, the revenue objective is achieved by finding the highest revenue for the promotion event that meets margin budget 146. The highest revenue offer 204 and price rule 206 for each product generates the highest revenue for the promotion event. Typically, however, the overall high revenue solution is below margin budget 146, and a search is made for the highest feasible selection of products, offers 204, and price rules 206.

Pure-unit sales strategy 306 is achieved by finding the highest unit sales for the promotion event that meets margin budget 146. Typically, unit sales strategy 306 is a profit-unit sales compromise since as unit sales increase with lowering price, a lower margin results until margin budget 146 is not met.

Promotion optimization engine 116 utilizes frontier mathematics to find trade-offs between profit, revenue, and unit sales objectives of an enterprise to arrive at promotion plan 128 whose combination of products, offers 204, and price rules 206 most closely meets the selected one of promotion strategies 300 without violating margin budget 146. Frontier mathematics entails the computation of extreme points, also known as boundary points or frontier points. In general, for any bounded set S and any linear objective function f(x), x∈S, there will be a maximum value of f(x) where x is an extreme point of S. An extreme point in S is a point not in an open line segment between two other points in S.

Solutions for the six two-objective promotion strategies 300 are found by finding the nearest extreme-point combinations of products, offers 204 and price rules 206 to weighted averages of pure strategies (i.e., pure-profit strategy 302, pure-revenue strategy 304, and pure-unit sales strategy 306). A weighted average for a two-objective strategy A-B may be ($\frac{2}{3}$)A+($\frac{1}{3}$)B. For example, profit-revenue strategy 308 uses a pure-profit optimum and a pure-revenue optimum and looks for the closest extreme-point solution to ($\frac{2}{3}$)profit+($\frac{1}{3}$)revenue.

Solutions for the six three-objective promotion strategies 300 are found by finding the nearest extreme-point combinations of products, offers 204 and price rules 206 to weighted averages of all three pure strategies. A weighted average for a three-objective strategy A-B-C may be ($\frac{4}{7}$)A+($\frac{2}{7}$)B+($\frac{1}{7}$)C. For example, profit-revenue-unit sales strategy 320 uses pure-profit optimum, a pure-revenue optimum, and pure-unit sales optimum and looks for the closest extreme-point solution to ($\frac{4}{7}$)profit+($\frac{2}{7}$)revenue+($\frac{1}{7}$)unit sales.

FIG. 4

Figure 4:
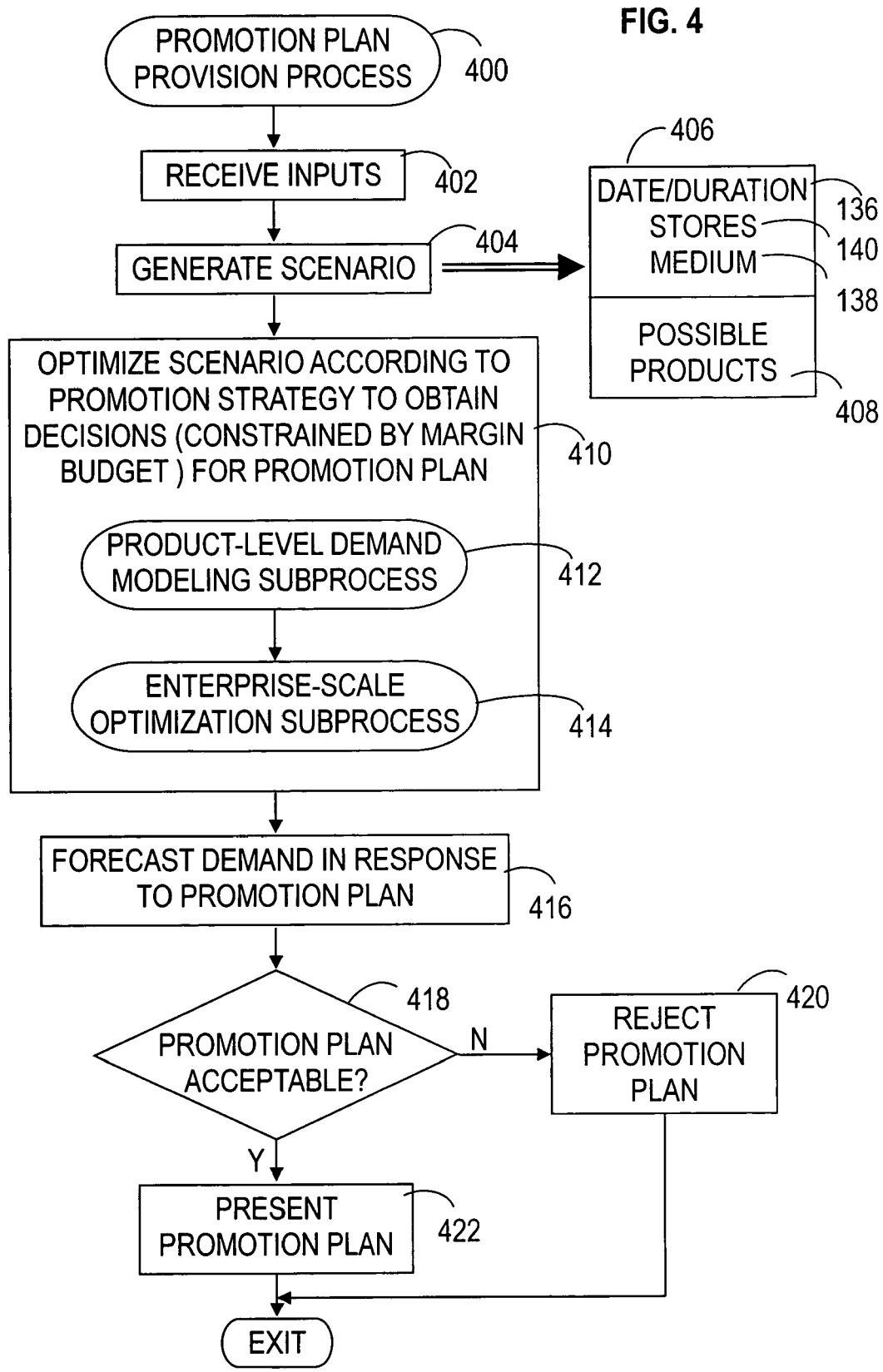
FIG. 4 shows a flowchart of a promotion plan provision process in accordance with a preferred embodiment of the present invention.

FIG. 4 shows a flowchart of a promotion plan provision process 400 in accordance with a preferred embodiment of the present invention. FIG. 4 provides a conceptual vision of the present invention for comprehensiveness of description. However, those skilled in the art will readily recognize that task flow may vary greatly from that which is presented herein in response to actual code instructions of a computer program of the present invention. In addition, it should be understood that tasks described herein may be performed manually by a decision-maker or may be carried out, at least in part, within computing environment 100 by scenario generator 114 and promotion optimization engine 116.

Promotion plan provision process 400 begins with a task 402. At task 402, data inputs 126 are received at processor 102 via input 104. As mentioned above, data inputs 126 may include event date/duration 136, advertising medium 138, store list 140, promotion strategy 144, and margin budget 146. Store list 138 may include a portion or all stores within a particular enterprise. Thus, in a large enterprise, promotion plan 128 may be optimized for a particular region. Data inputs 126 may also include product base data 142 which is a listing of products that may be included in a promotion event and their associated current price per store 148, cost per store 150, and promotion choice 152. Of course, product base data 142 need not be entered at an onset of promotion plan provision process 400, but may instead be stored within a library, or database (not shown), of computing environment 100.

A task 404 is performed in connection with 402. At task 404, a scenario 406 for promotion plan 128 is generated through execution of scenario generator 114. At task 402, a user may be provided with a user interface that allows the user to enter various data inputs 126. Scenario generator 114 compiles data inputs 126 into scenario 406 for a promotion event 408. Scenario 406 can include date/duration 136, store list 140, advertising medium 138, and a list 408 of possible products that may be involved in the promotion event. The particular products, with their associated offers 204 and price rules 206, have not yet been determined from list 408 at task 404.

Following task 404, a task 410 is performed by promotion optimization engine 116. At task 410, scenario 406 is optimized in accordance with the user entered promotion strategy 144 to obtain decisions, i.e., product/promotion choice list 154, for promotion plan 128. These decisions includes an optimal combination of products, offers 204, and price rules 206 constrained by margin budget for product/promotion choice list 154 for a particular promotion event.

Task 410 includes a product-level demand modeling subprocess 412 and an enterprise-scale modeling subprocess 414. Product-level demand modeling subprocess 412 forecasts, or predicts, consumer demand for each of possible products in list 408 in response to each of promotion choices 202 (combination of offer 204 and price rule 206) for each product at each of stores 138. Subprocess 412 will be described in connection with FIGS. 5-11. Enterprise-scale optimization subprocess 414 is executed in response to demand outcomes produced by product-level demand modeling subprocess 412. Subprocess 414 is performed to aggregate the demand outcomes to find the optimal solution for promotion plan 128 constrained by margin budget 148 and defined by user entered promotion strategy 144. Subprocess 414 will be described in connection with FIGS. 12-24.

Execution of product-level demand modeling subprocess 412 and an enterprise-scale modeling subprocess 414 at task 410 yields promotion plan 128. Following task 410, a task 416 is performed to forecast consumer demand for the products presented in product/promotion choice list 154 of promotion plan 128. Task 416 may be accomplished through the execution of demand model 122, an exemplary demand model 122 being shown in FIG. 6. However, various consumer demand models known to those skilled in the art may be executed at task 416.

Following task 416, a query task 418 determines whether promotion plan 128 is acceptable. Acceptability of promotion plan 128 may be ascertained by the user, such as a pricing manager, a representative of the enterprise, and the like, who is authorized to make decisions as to the feasibility of promotion plan. When promotion plan 128 is determined to be unacceptable at query task 418, process flow continues with a task 420.

At task 420, the user may reject promotion plan 128. Rejection of promotion plan 128 may result in the revision of scenario 406 by implementing, for example, more aggressive promotion events, deeper discounts, promotion events with more promotional lift, a different menu of products, and so forth. Following task 420, promotion plan provision process 400 exits.

When promotion plan 128 is determined to be acceptable at query task 418, process flow continues with a task 422. At task 422, promotion plan 128 is presented to pricing managers, store managers, advertising representatives, and the like for implementation by the enterprise during the promotion event. Furthermore, since optimization takes into account a list of stores 140, current price per store 148, and cost per store 150, each of the stores 140 can adjust the current price per store 148 for a product to a promotion price in accordance with the associated product/promotion choice list 154 provided in promotion plan 128. Following task 422, promotion plan provision process 400 exits.

FIG. 5

Figure 5:
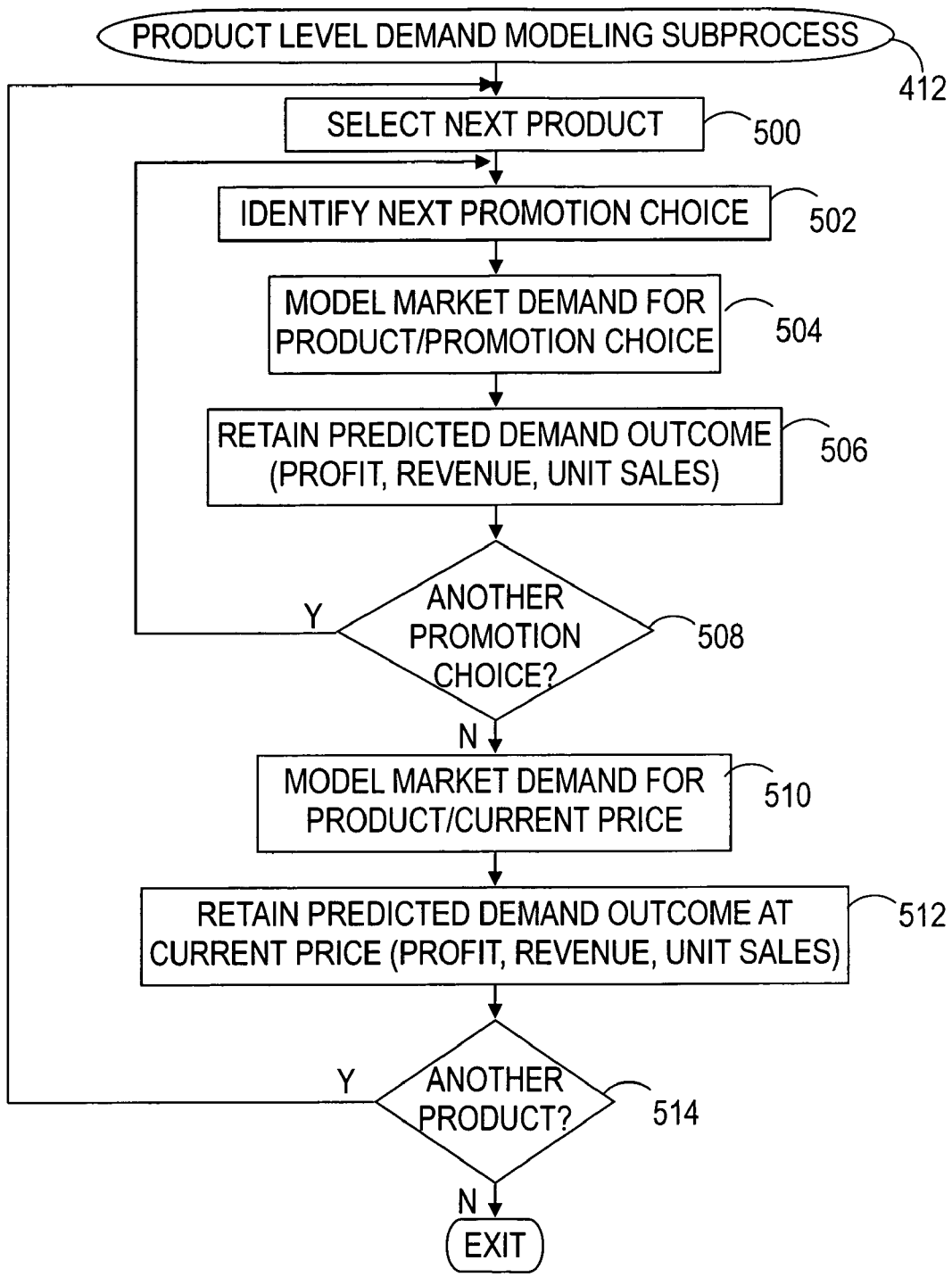
FIG. 5 shows a flowchart of a product level demand modeling subprocess.

FIG. 5 shows a flowchart of product-level demand modeling subprocess 412 executed in connection with optimization task 410 of promotion plan provision process 400. Product-level demand modeling subprocess 412 is performed on a per product basis to obtain demand outcomes for promotion choices 202 (offers 204 and price rules 206) allowable for that product.

Subprocess 412 begins at a task 500. At task 500, a "next" product is selected from list 408 of products in scenario 406. It should be noted that at a first iteration of task 500, the "next" product is a first one of the products in list 408. Thereafter, the term "next" applies.

A task 502 is performed in response to task 500. At task 502, a "next" promotion choice 202 is identified for the product selected at task 500. Again it should be noted that at a first iteration of task 502, the "next" promotion choice 202 is a first one of promotion choices 202 allowable for that particular product. Thereafter, the term "next" applies. Selection task 500 and identification tasks 502 are exemplified below in connection with FIG. 6. Subsequent tasks in the flowchart of FIG. 5 shall be discussed herein below, following discussion of FIG. 6.

FIG. 6

FIG. 6 shows a table of demand outcome database 130 that includes products 600 and promotion choices 202 for which demand outcomes 604 are to be obtained. Products 600 are those in list 408 of scenario 406, and only a few products 600 and promotion choices 202 are shown for simplicity of illustration. However, as shown in connection with a first one of products 600, labeled "A", one of offers 204 allowable with product "A" 600 is "Discount Percent". In addition, price rules 206 indicate various allowable percent discounts (10%, 20%, and 30%). As further shown, promotion choices 202 for product "A" 600 need not be limited to a single one of offers 204. For example, promotion choices 202 of discount amount offer 204 with prices rules 206 of amounts off ($0.20 and $0.30) for product "A" 600 are also allowable. It should be noted that a single one of promotion choices 200 is one offer 204 and one specified price rule 206, for example Discount Percent and 20% off.

The object of product level demand modeling subprocess 412 is to find demand outcomes 604 for each product 600 and each promotion choice 202 at each of stores 140 listed in scenario 406. Demand outcomes 604 include a profit amount 606, a revenue amount 608, and a unit sales amount 610 that will be used to obtain decisions for promotion plan 128.

FIG. 5 Continued

Referring back to product demand modeling subprocess 412, following tasks 500 and 502, a task 504 is performed. At task 504 market demand for the selected product 600 and promotion choice 202 is performed. Modeling task 504 is exemplified below in connection with FIG. 7. Subsequent tasks in the flowchart of FIG. 5 shall be discussed herein below, following discussion of FIG. 7.

FIG. 7

FIG. 7 shows a table 700 depicting demand model 122. While a variety of demand models may be utilized, FIG. 7 presents an exemplary demand model that models shopper demand for product 600 in a particular store in response to the identified promotion choice 202. The term $v_c$ for promotion lift reflects the increase in unit sales from a promotion event, c, other than the effect of a price change. The effect of a price change is addressed in the term $-\beta p$. Execution of demand model 122 yields profit amount 606, revenue amount 608, and unit sales amount 610.

FIG. 5 Continued

Referring back to product demand modeling subprocess 412, in response to modeling task 504, a task 506 is performed. At task 506, demand outcome 604 for the selected product 600 and promotion choice 202 is retained in, for example, demand outcome database 130.

Following task 506, a query task 508 is performed. At query task 508, a determination is made as to whether there is another one of promotion choices 202 associated with product 600 selected at task 500. When there is another promotion choice 202, process control loops bask to task 502 to identify the next one of promotion choices 202 and model market demand for that next one of promotion choices 202. However, when query task 508 determines that all promotion choices 202 for the selected one of products 600 have been exhausted, process control proceeds to a task 510.

At task 510, market demand is modeled for the selected product "A" 600 at its current price per store 140. Market demand can be modeled utilizing demand model 122 to obtain a demand outcome 604 (profit amount 606, revenue amount 608, and unit sales amount 610) at regular price.

A task 512 is performed in connection with task 510. A task 512, demand outcome 604 for the selected product "A" 600 at its current price is retained in, for example, extreme points database 132.

Following task 512, a query task 514 is performed. At query task 5140, a determination is made as to whether there is another of products 600 from list 408 of products in scenario 406 for which demand for various promotion choices 202 is to be modeled. When there is another of products 600, program control loops back to task 500 to select the next one of products 600 and conduct another iteration of subprocess 412. However, when all products 600 have been exhausted form list 408, product level demand modeling subprocess 412 exits. The result of execution of subprocess 412 is population of demand outcome database 130.

FIGS. 8-9

Figure 8:
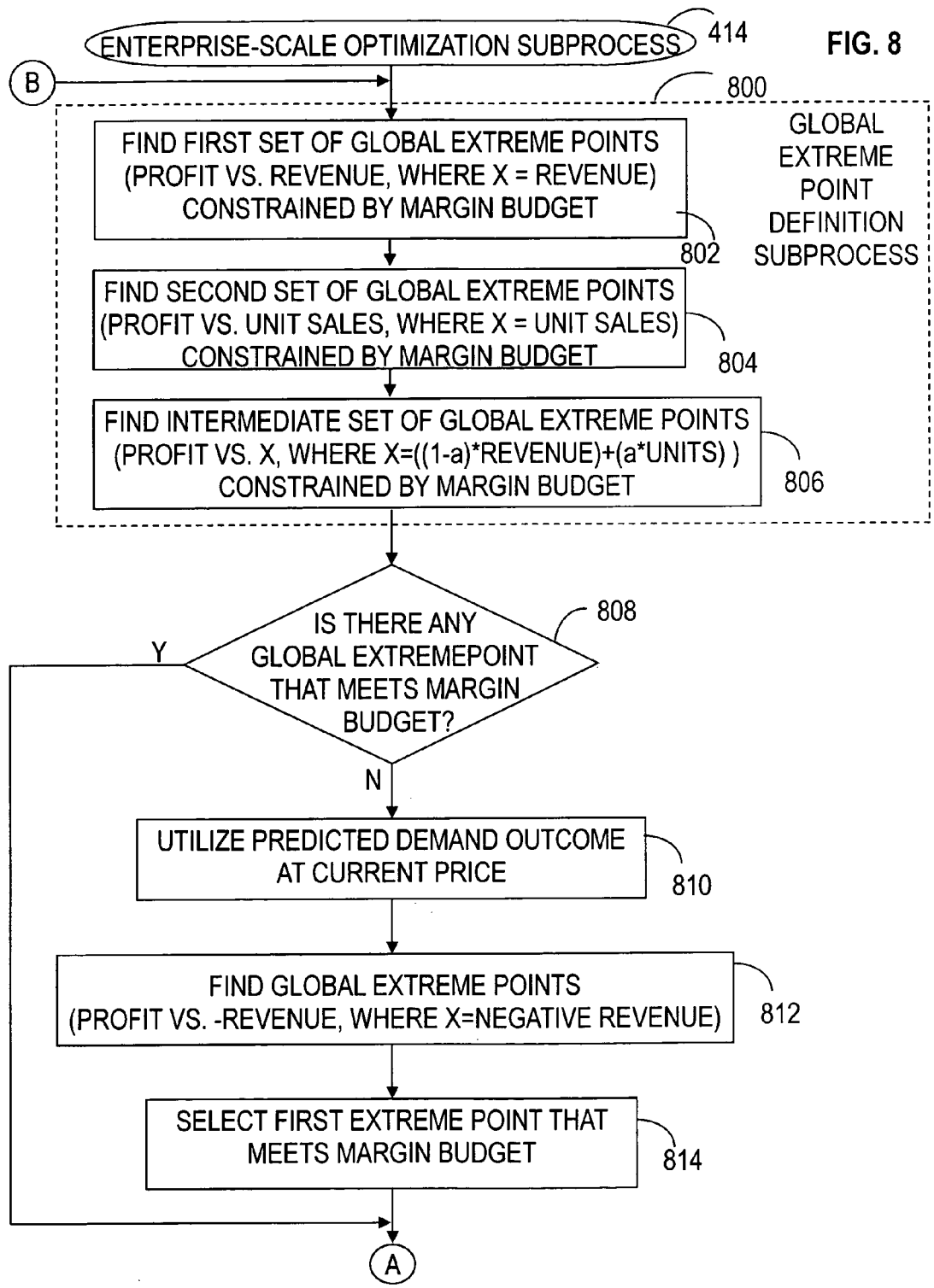
FIGS. 8-9 show a flowchart of an enterprise-scale optimization process.
Figure 9:
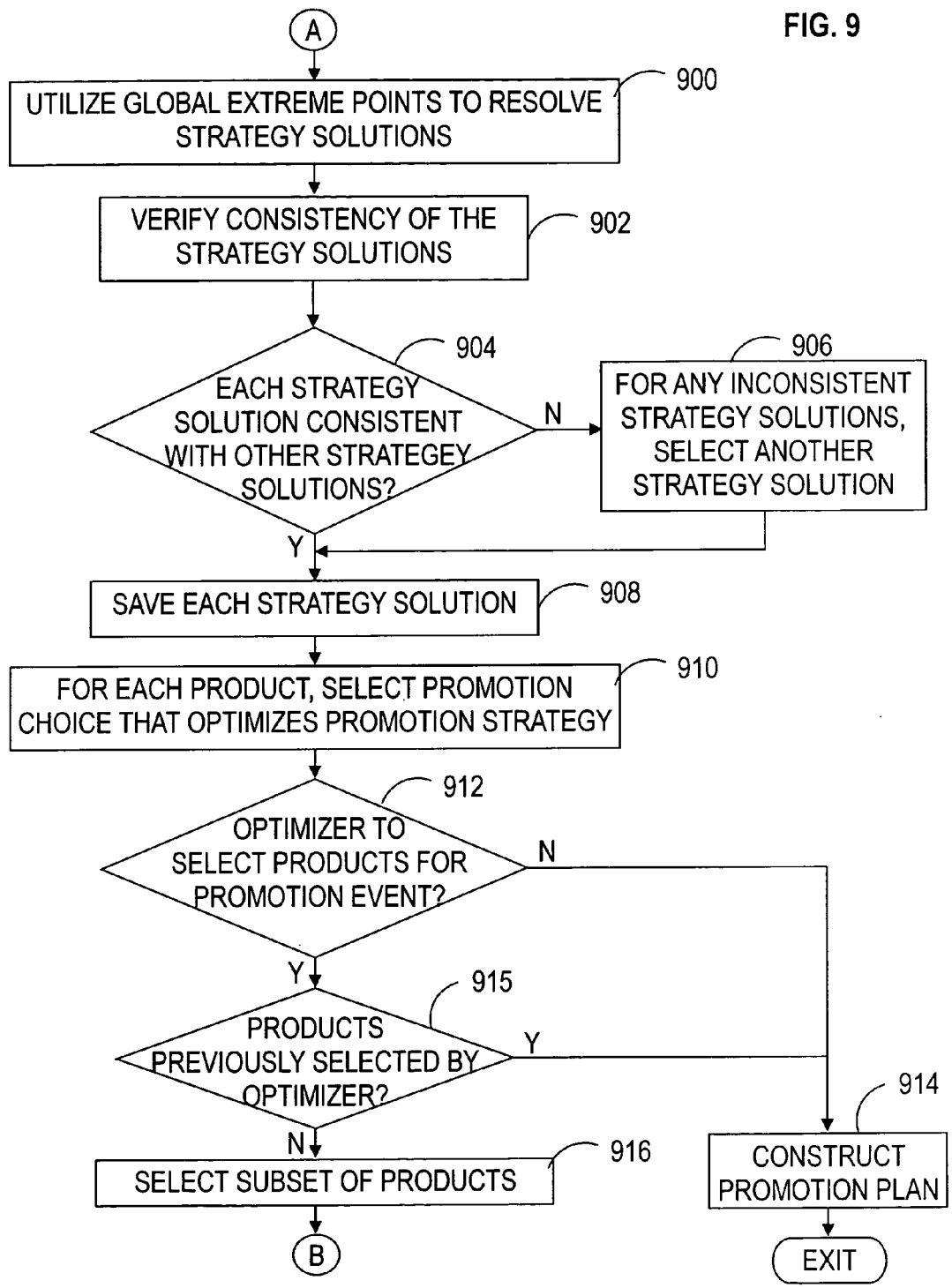

FIGS. 8-9 show a flowchart of enterprise-scale optimization process 414. Enterprise-scale optimization subprocess 414 is executed in response to demand outcomes 604 produced by product-level demand modeling subprocess 412. Subprocess 414 is performed to aggregate demand outcomes 604 to find the optimal solution for promotion plan 128 constrained by margin budget 148 and defined by user entered promotion strategy 144.

Enterprise-scale optimization subprocess 414 begins with a global extreme point definition subprocess 800. Global extreme point definition subprocess 1200 functions to aggregate demand outcomes 604. Through the execution of subprocess 1200, a series of tasks of enterprise-scale optimization subprocess 414 are accomplished. In particular, subprocess 1200 performs a task 802, a task 804, and a task 806.

At task 802, a first set of global extreme points (profit versus revenue, where X=revenue) are found, constrained by margin budget 146. At task 804, a second set of global extreme points (profit versus unit sales, where X=unit sales) are found, constrained by margin budget 146. At 806, an intermediate set of global extreme points, profit versus X, where X=((1−a)*revenue)+(a*unit sales), is found. These global extreme points represent a two-dimensional surface in a three-dimensional space, i.e., a frontier surface of profit, revenue, and unit sales. This frontier surface of global extreme points will be projected onto the planar strategy triangle of FIG. 3 to obtain strategy solutions, discussed below. Global extreme point definition subprocess 800 is described in connection with FIGS. 10-11. Subsequent tasks in the flowchart of FIGS. 8-9 shall be discussed herein below, following discussion of FIGS. 10-11.

FIGS. 10-11

Figure 10:
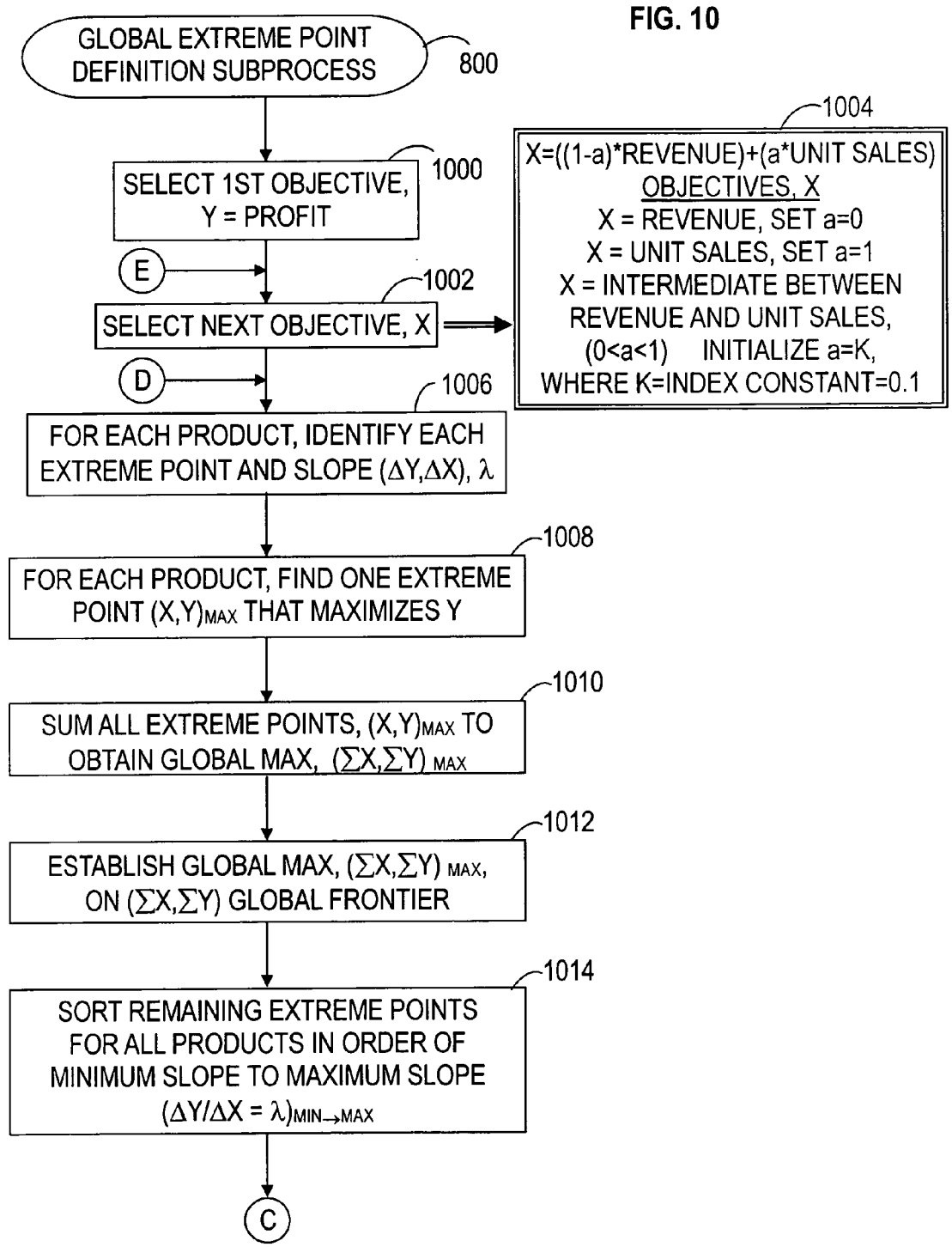
FIGS. 10-11 show a flowchart of a global extreme point definition subprocess.
Figure 11:
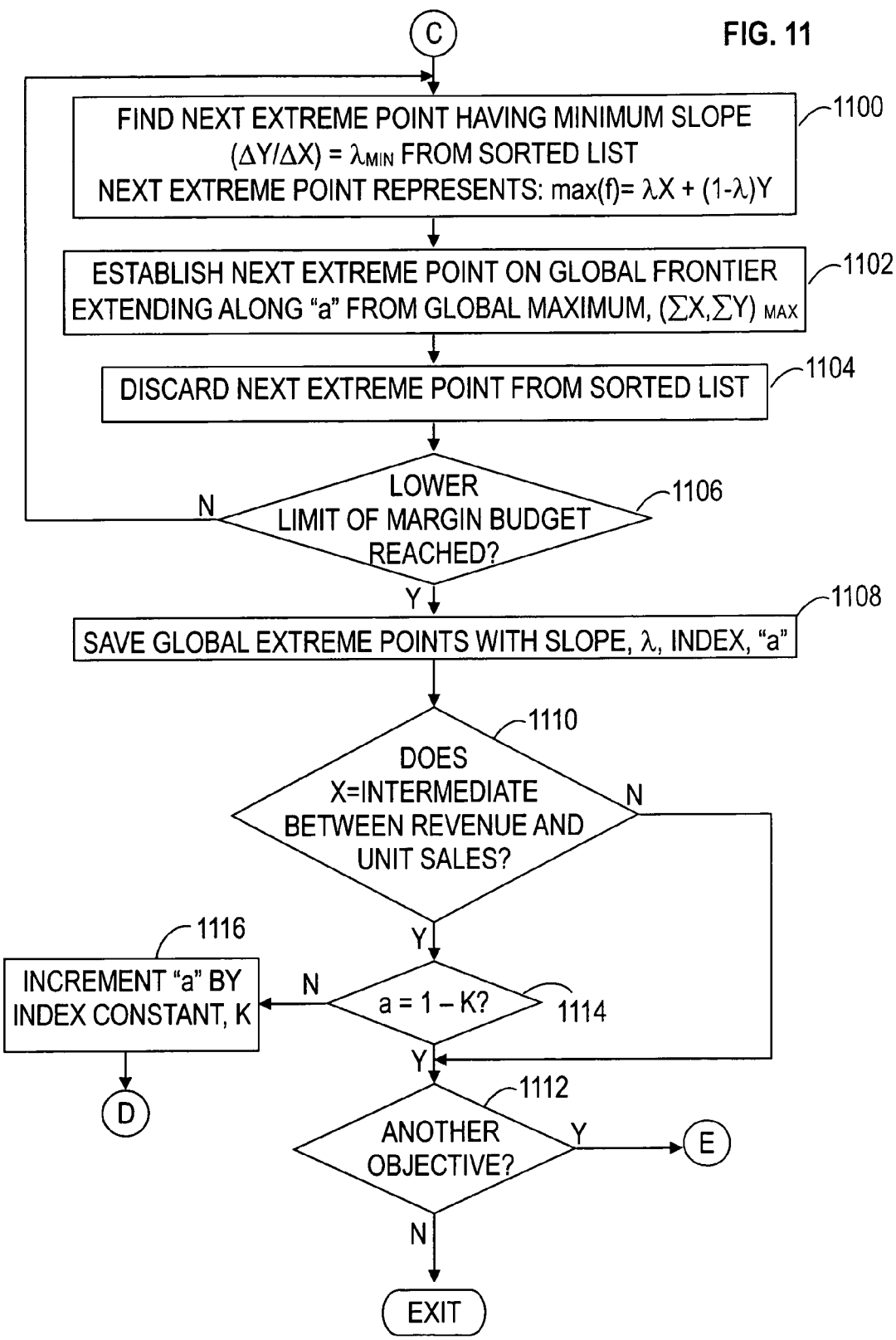

FIGS. 10-11 show a flowchart of global extreme point definition subprocess 800. Subprocess 800 finds global extreme points for all products 600 that represent a two-dimensional surface in a three-dimensional space, i.e., a frontier surface of optimal outcomes of profit, revenue, and unit sales.

Subprocess 800 begins with a task 1000. At task 1400, a first objective is selected. In this illustration, the first objective is the profit objective. Consequently, a Y coordinate in a two-dimensional coordinate system characterizing the extreme point is profit.

A task 1002 is performed in connection with task 1000. A next objective is selected at task 1002. In a preferred embodiment of the present invention, there are three possible "next" objectives for the X coordinate in the two-dimensional coordinate system characterizing the extreme point. As noted in a chart 1004, X=((1−a)*revenue)*(a*unit sales). The three objectives are X=revenue with "a" set to zero, X=unit sales with "a" set to one, and X=((1−a)*revenue)*(a*unit sales) for 0<a<1. At a first iteration of subprocess 800, the "next" objective is one of the objectives for X. In this situation, revenue is selected, and "a" is set to zero.

A task 1006 is performed following task 1002. At task 1006, first extreme points are identified for each of products 600. In this exemplary situation first extreme points are profit amount 606 vs. revenue amount 608 for the selected product 600. Extreme point identification task 1010 is exemplified below in connection with FIGS. 12-13. Subsequent tasks in the flowchart of FIGS. 10-11 shall be discussed herein below, following discussion of FIGS. 12-13.

FIGS. 12-13

Figures 12, 13:
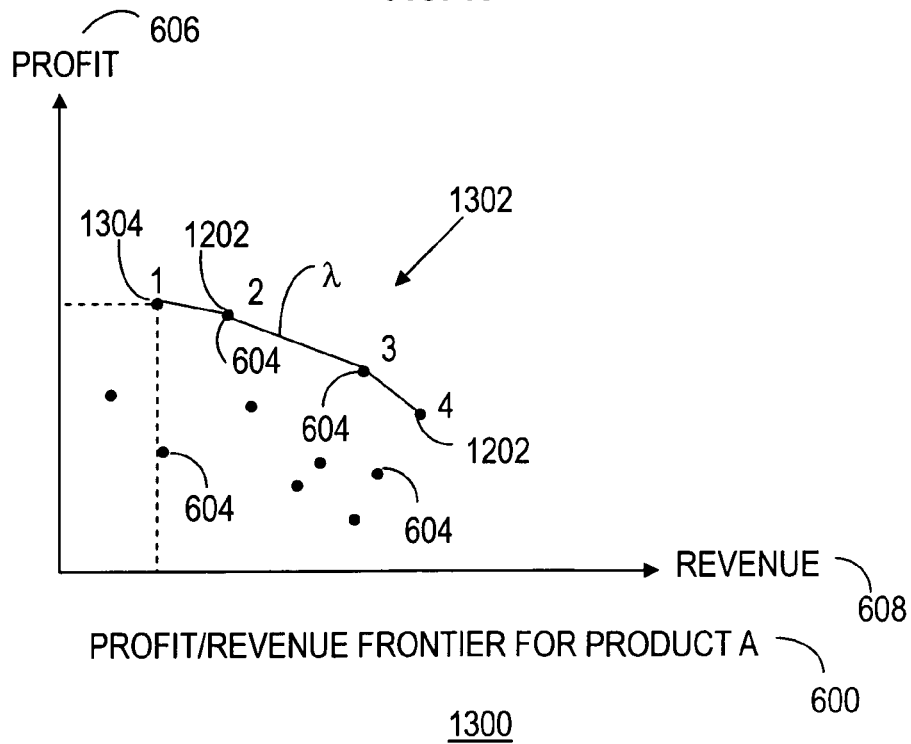
FIG. 12 shows a table that may form part of an extreme points database.
FIG. 13 shows a graph of an exemplary frontier of first extreme points of profit versus revenue for one product.

FIG. 12 shows a table 1200 that may form part of extreme points database 132 in which identified first extreme points 1202 of profit amount 606 versus revenue amount 608 found for each of products 600 may be retained. FIG. 13 shows a graph 1300 of an exemplary frontier 1302 of first extreme points 1202 of profit 606 versus revenue 608 for one of products 600, labeled "A." As shown in graph 1300, profit 606 is represented by the y axis and revenue 608 is represented by the x axis.

A number of demand outcomes 604 for profit 606 versus revenue 608 for product "A" 600 are shown in graph 1300. Identification task 1010 finds the set of first extreme points 1202 that belong on frontier 1302. A first one 1304, labeled "1", of first extreme points 1202 represents one of promotion choices 202 for which maximum profit 606 can be realized. Subsequent sequential first extreme points 1202 are those points having a minimum slope, $(\Delta Y/\Delta X)=\lambda$, with a larger X-coordinate, i.e., revenue 608. The slope, $\lambda$, is the value needed to get to the "next" extreme point along frontier 1302. Exemplary first extreme points 1202 and a minimum slope, $\lambda$, 1204 are presented in table 1200.

FIGS. 10-11 Continued

Referring back to global extreme point definition process 800, following identification task 1006, a task 1008 is performed. At task 1008, for each of products 600, one of extreme points 1202 is found that maximizes Y, i.e., profit. These extreme points 1202 were previously retained in extreme points database 132.

Following task 1008, a task 1010 is performed. At task 1010, all of the maximum extreme points 1202, $(X,Y)_{MAX}$ are summed to obtain a global maximum extreme point, $(\Sigma X, \Sigma Y)_{MAX}$. The maximum extreme point 1202, $(X,Y)_{MAX}$ represents one of promotion choices 202 for the corresponding product 600 that yields the highest possible profit for that product 600. Consequently, this global maximum extreme point represents the highest possible profit for the entire combination of products 600.

A task 1012 is performed in connection with task 1010. At task 1012, this global maximum extreme point, $(\Sigma X, \Sigma Y)_{MAX}$ is established on a global frontier.

Next, a task 1014 is performed. At task 1014, all remaining extreme points 1202 for all products 600 from extreme points database 132 are sorted in order of minimum to maximum slope 1204, $(X,Y)_{MIN \rightarrow MAX}$.

Following task 1014, a task 1100 finds the next one of extreme points 1202 having the minimum slope 1204 from the sorted list. This next extreme point 1202 represents the objective function: $\max(f)=\lambda X+(1-\lambda)Y$.

A task 1102, performed in response to task 1100, establishes this next extreme point 1202 on the global frontier extending along "a" (in this first iteration a=0) from the global maximum extreme point, $(\Sigma X, \Sigma Y)_{MAX}$.

Next, a task 1104 discards this extreme point 1202 from the sorted list so that is it no longer under consideration.

The execution of tasks 1008, 1010, 1012, 1014, 1100, and 1102 is exemplified below in connection with FIGS. 14-15. Subsequent tasks in the flowchart of FIGS. 10-11 shall be discussed herein below, following discussion of FIGS. 14-15.

FIGS. 14-15

Figures 14, 15:
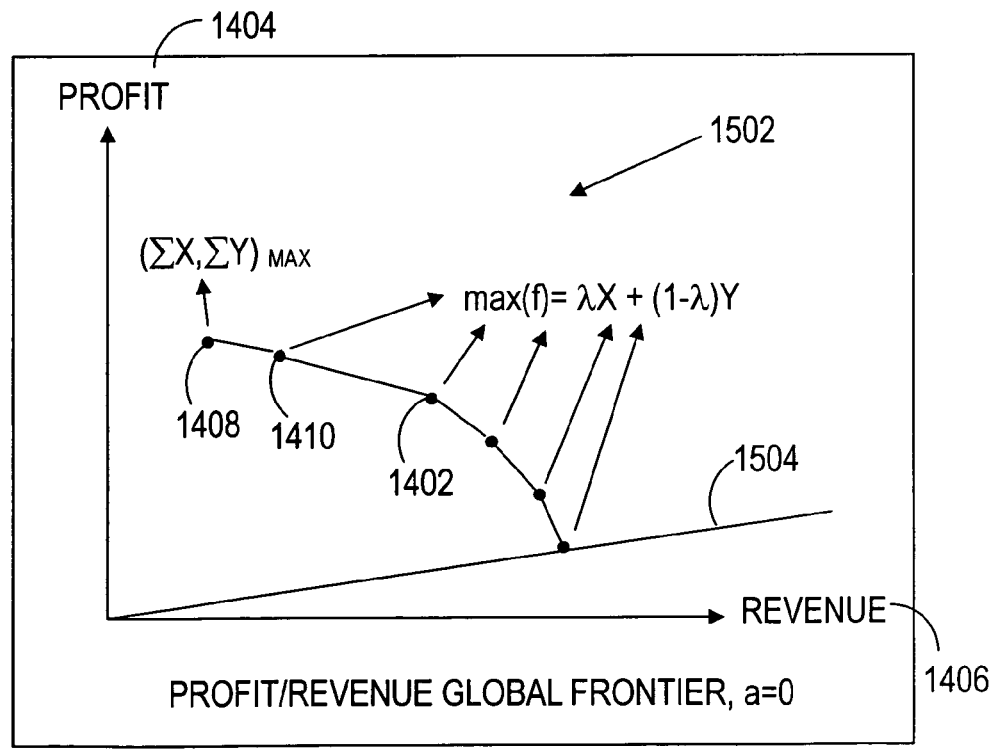
FIG. 14 shows a table of global extreme points for profit versus revenue obtained through the execution of the global extreme point definition subprocess.
FIG. 15 shows a graph of an exemplary first global frontier of the global extreme points of FIG. 14.

FIG. 14 shows a table 1400 of global extreme points 1402 for a profit objective 1404 versus a revenue objective 1406 obtained through the execution of tasks 1008, 1010, 1012, 1014, 1100, and 1102 of global extreme point definition subprocess 800. FIG. 15 shows a graph 1500 of an exemplary first global frontier 1502 of global extreme points 1402.

A global maximum extreme point, $(\Sigma X, \Sigma Y)_{MAX}$, 1408 is listed in table 1400 and is illustrated in graph 1500. A second global extreme point 1410 is also listed in table 1400 and is illustrated in graph 1500. It should be noted that second global extreme point 1410 is one of extreme points 1202 for all products 600 having the minimum slope 1204. In accordance with the present invention, the X (revenue amount 608) and Y (profit amount 606) values for second global extreme point 1410 are added to global maximum extreme point 1408 to establish the location of second global extreme point 1410 on first global frontier 1502 as an extension from global maximum extreme point 1408.

It should also be noted in graph 1500 that a lower limit 1504 of margin budget 146 is illustrated. Through the execution of tasks in global extreme point definition subprocess 800, first global frontier 1502 is established until lower limit 1504 of margin budget 146 is reached. That is, establishment of first global frontier 1502 is restricted by lower limit 1504 of first global frontier 1502.

FIGS. 10-11 Continued

Referring back to global extreme point definition subprocess 800, following task 1104, a query task 1106 is performed. At query task 1106, a determination is made as to whether lower limit 1504 of margin budget 146 has been reached. When lower limit 1504 has not been reached, process control loops back to task 1100 to find the next extreme point 1202 having minimal slope 1204, and subsequently establish it on first global frontier 1502. When lower limit 1504 has been reached, subprocess 800 proceeds with a task 1108.

At task 1108, global extreme points 1402 on first global frontier 1502 are saved in connection with their slope, $\lambda$, 804 and an index, "a" (in this first iteration a=0) in global extreme points database 134. These global extreme points 1402 represent those optimums on the right side of the strategy triangle of FIG. 3.

Following task 1108, a query task 1110 determines whether the selected objective "X" represents the intermediate between revenue and unit sales (i.e., 0<a<1). When X is not the intermediate, that is, when X is either revenue (a=0) or unit sales (a=1), process control proceeds to a query task 1112. However, when X is the intermediate between revenue and unit sales, process control proceeds to a query task 1114 (discussed below).

Query task 1112 determines whether the aforementioned tasks are to be performed for another objective "X". In a preferred embodiment, the tasks are repeated to obtain the optimums on the left side of the strategy triangle of FIG. 3 for X=unit sales (a=1). In addition, the tasks are repeated to obtain the optimums that define intermediate global extreme points along a three dimensional frontier surface constrained by margin budget 146 for X=((1−a)*revenue)+(a*unit sales) and 0<a<1). Consequently, when the aforementioned tasks have not yet been performed for the next objective, for example, unit sales, process control loops back to task 1002. The execution of task 1006 of global extreme definition subprocess 800 for the unit sales objective is exemplified below in connection with FIGS. 16-17. In addition, the execution of tasks 1008, 1010, 1012, 1014, 1100, and 1102 of global extreme point definition subprocess 800 for the unit sales objective is exemplified below in connection with FIGS. 18-19. Subsequent tasks in the flowchart of FIGS. 10-11 shall be discussed herein below, following discussion of FIGS. 16-19.

FIGS. 16-17

Figures 16, 17:
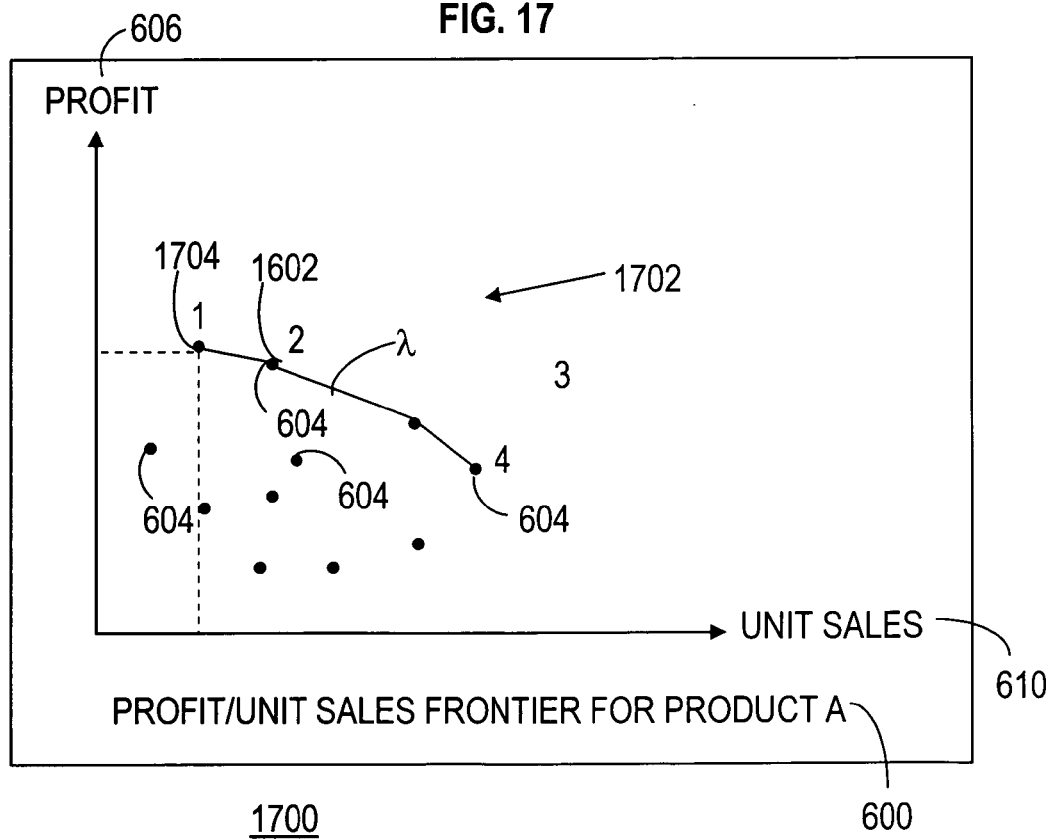
FIG. 16 shows a table of extreme points of profit versus unit sales that may form part of the extreme points database.
FIG. 17 shows a graph of an exemplary frontier of second extreme points of profit versus unit sales for one product.

FIG. 16 shows a table 1600 that may form part of extreme points database 132 in which identified second extreme points 1602 of profit amount 606 versus unit sales amount 610 found for each of products 600 may be retained. FIG. 17 shows a graph 1700 of an exemplary frontier 1702 of second extreme points 1602 of profit 606 versus unit sales 610 for one of products 600, labeled "A." As shown in graph 1700, profit 606 is still represented by the y axis and units sales 610 is represented by the x axis.

A number of demand outcomes 604 for profit 606 versus unit sales 610 for product "A" 600 are shown in graph 1700. Identification task 1006 finds the set of second extreme points 1602 that belong on frontier 1702. A first one 1704, labeled "1", of second extreme points 1602 represents one of promotion choices 202 for which maximum profit 606 can be realized. Subsequent sequential second extreme points 1602 are those points having a minimum slope, $(\Delta Y/\Delta X)=\lambda$, with a larger X-coordinate, i.e., unit sales 610. The slope, $\lambda$, is the value needed to get to the "next" extreme point along frontier 1702. Exemplary second extreme points 1602 and a minimum slope, $\lambda$, 1604 are presented in table 1600.

FIGS. 18-19

Figure 18:
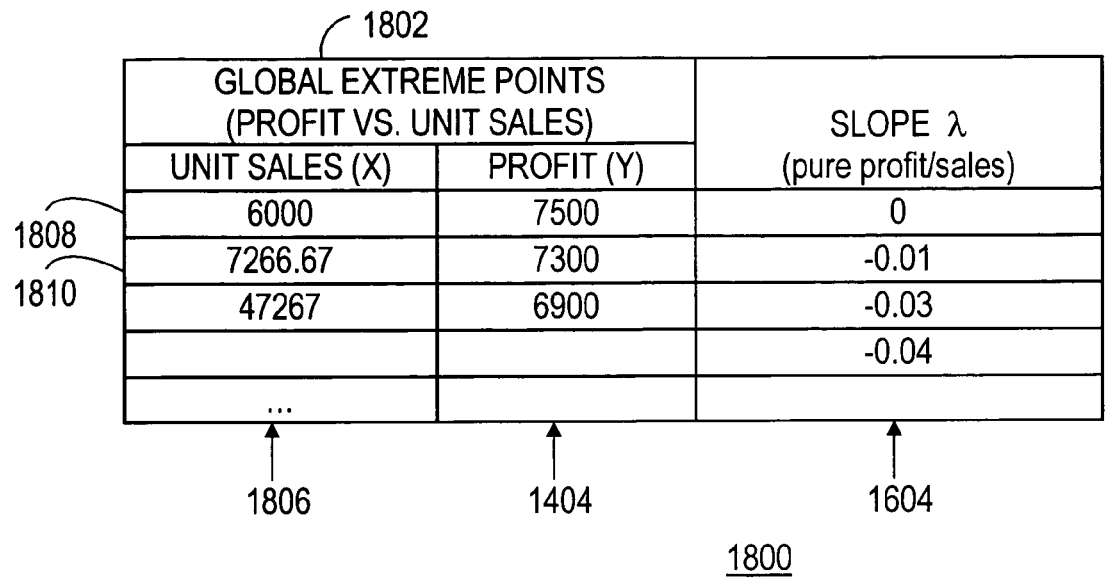
FIG. 18 shows a table of global extreme points for profit versus unit sales obtained through the execution of the global extreme point definition subprocess.
Figure 19:
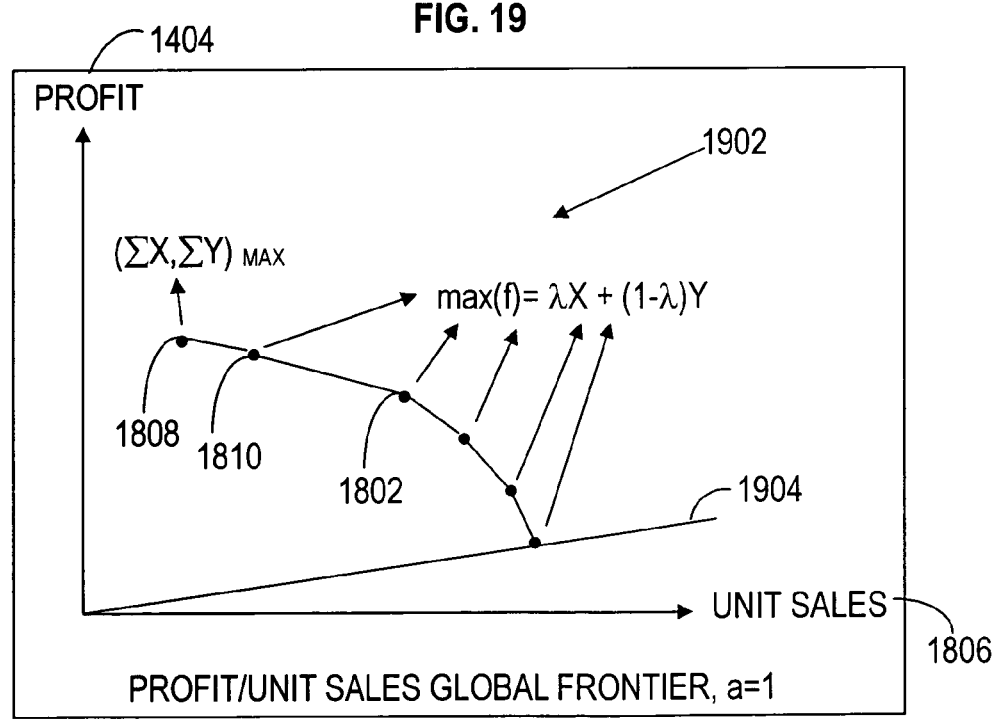
FIG. 19 shows a graph of an exemplary second global frontier of the global extreme points of FIG. 18.

FIG. 18 shows a table 1800 of global extreme points 1802 for profit objective 1404 versus a unit sales objective 1806 obtained through the execution of tasks 1008, 1010, 1012, 1014, 1100, and 1102 of global extreme point definition subprocess 800. FIG. 19 shows a graph 1900 of an exemplary second global frontier 1902 of global extreme points 1802.

A global maximum extreme point, $(\Sigma X, \Sigma Y)_{MAX}$, 1808 is listed in table 1800 and is illustrated in graph 1900. A second global extreme point 1810 is also listed in table 1800 and is illustrated in graph 1900. It should be noted that second global extreme point 1810 is one of extreme points 1602 for all products 600 having the minimum slope 1604. In accordance with the present invention, the X (unit sales amount 610) and Y (profit amount 606) values for second global extreme point 1610 are added to global maximum extreme point 1808 to establish the location of second global extreme point 1610 on second global frontier 1902 as an extension from global maximum extreme point 1808.

A lower limit 1904 (adjusted for profit versus unit sales) of margin budget 146 is illustrated in graph 1900. Through the execution of tasks in global extreme point definition subprocess 800, second global frontier 1902 is established until lower limit 1904 of margin budget 146 is reached. That is, establishment of second global frontier 1902 is restricted by lower limit 1904 of second global frontier 1902. As discussed above, process control loops back to task 1100 to find the next extreme point 1602 having minimal slope 1604, and subsequently establish it on second global frontier 1902. When lower limit 1904 has been reached, global extreme points 1802 on second global frontier 1902 are saved in connection with their slope, $\lambda$, 1004 and an index, "a" (where a=1 in this second iteration of subprocess 800) in global extreme points database 134. These global extreme points 1902 represent those optimums on the left side of the strategy triangle of FIG. 3.

FIGS. 10-11 Continued

Referring back to global extreme point definition subprocess 800, following a second iteration of subprocess 800 when a determination is made at query task 1112 that the aforementioned tasks are to be performed for yet another objective "X" as discussed above, process control again loops back to task 1002 to select the next objective, X. For this situation, the next objective is X, where X=((1−a)*revenue)+(a*unit sales).

In this illustration, the aforementioned tasks are repeated to obtain the optimums that define intermediate global extreme points that represent a two-dimensional surface in a three-dimensional space, i.e., a frontier surface, constrained by margin budget 146 for X=((1−a)*revenue)+(a*unit sales) and 0<a<1. As such, "a" is initialized to a=K, where K equals the index constant, 0.1. Processing begins with the index "a" at 0.1 because the case where a=0 was found above as the profit-revenue first global frontier curve 1502. Although an index constant K of 0.1 is utilized herein, it should be understood, that the index constant need not necessarily be 0.1, but can be greater or smaller than 0.1.

In general, the object is to sweep the frontier surface in the three dimensions of profit, revenue, and unit sales by an index "a" from 0 to 1. Once the frontier surface of extreme points for all the sums over all products 600 is obtained, a solution may be selected.

As discussed previously, task 1006 is performed for each of products 600 to identify each extreme point and slope, task 1008 is performed to find one extreme point $(X,Y)_{MAX}$ that maximizes Y, and task 1010 subsequently sums all extreme points $(X,Y)_{MAX}$ to obtain the global maximum extreme point. Now, task 1012 establishes the global maximum, $(\Sigma X, \Sigma Y)_{MAX}$, on the global frontier surface. As before, the remaining extreme points are sorted at task 1014, and task 1100 finds a "next" intermediate extreme point having a minimum slope. The next intermediate extreme point represents a solution for the objective function max(f)=$\lambda$((1−a)*revenue)+(a*unit sales))+(1−$\lambda$)profit, where 0<a<1. This "next" intermediate extreme point is established on the frontier surface extending along index "a" from the global maximum, $(\Sigma X, \Sigma Y)_{MAX}$ at task 1102 and is discarded from the sorted list at task 1104.

Query task 1106 determines whether the lower limit of margin budget 146 is reached, and process control loops back to task 1100 when the lower limit of margin budget 146 has not been reached to find the next intermediate extreme point extending along index "a". However, when the lower limit of margin budget 146 is reached, program control proceeds to task 1108 where the global intermediate extreme points are saved in global extreme points database 134 with slope, $\lambda$, and index "a".

Following task 1108, query task 1110 determines whether X represents the intermediate between revenue and sales. In keeping with the present illustration and this third objective in which X=((1−a)*revenue)+(a*unit sales), and 0<a<1, process flow continues with query task 1114.

At query task 1114, a determination is made as to whether index a=1−K, which equals, in this case 0.9. When index "a" does not equal 0.9, subprocess 800 proceeds to a task 1116.

At task 1116, the index "a" is incremented by the index constant K, and process control loops back to task 1006 to identify extreme points and slopes for each product at the incremented value of a, and to find additional intermediate extreme points on the frontier surface. However, when "a" equals 0.9, process control proceeds to query task 1112 to determine whether the aforementioned tasks are to be performed for another objective "X" as discussed above. Of course, following repeated iterations for X=revenue, X=unit sales, and X=an intermediate between revenue and unit sales, global extreme point definition subprocess exits. The processing of intermediate extreme points ends with the index "a" at 0.9 because the case where a=1 was found above as the profit-unit sales second global frontier curve 1902. The result of execution of subprocess 800 when X is an intermediate between revenue and unit sales is generally illustrated below in connection with FIG. 20.

FIG. 20

Figure 20:
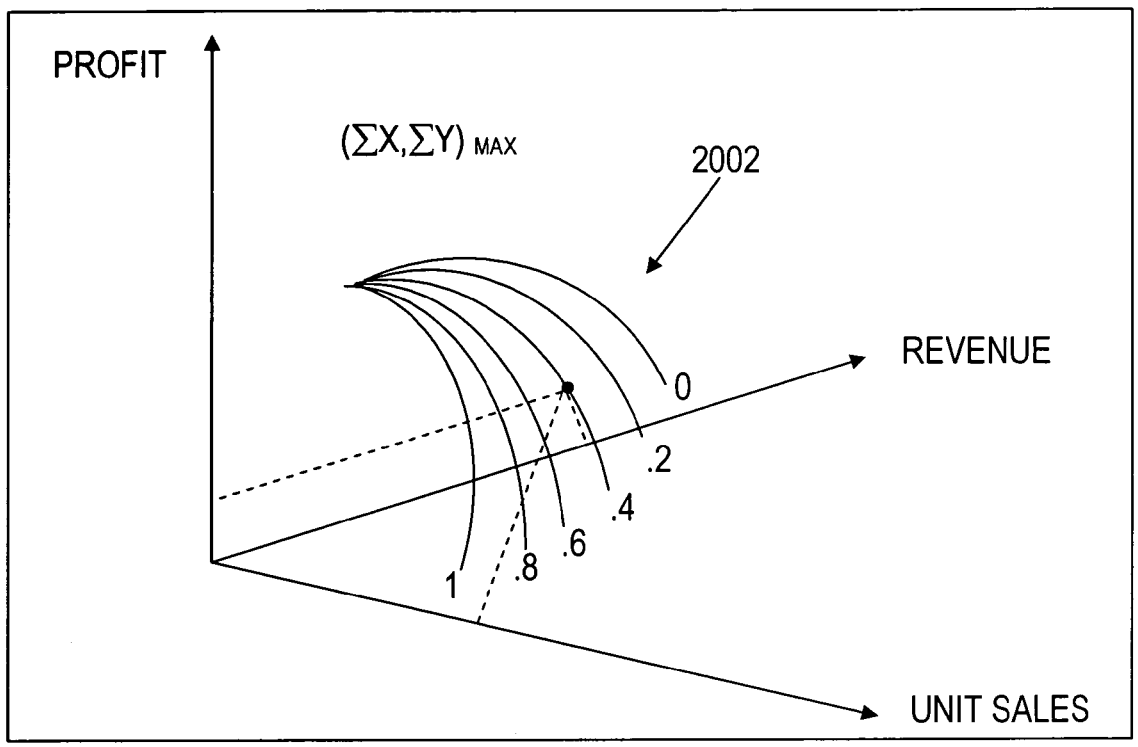
FIG. 20 shows a graph of an exemplary frontier surface that may be obtained through the execution of the global extreme point definition subprocess.

FIG. 20 shows a graph 2000 of an exemplary frontier surface 2002 that may obtained through the execution of the global extreme point definition subprocess 1200. Frontier surface 2002 is projected onto a three dimensional coordinate system of profit, revenue, and unit sales. Frontier surface 2002 is represented by a shower of extreme-point trajectories sweeping between 0 and 1.

FIGS. 8-9 Continued

Referring back to enterprise-scale optimization subprocess 414, following execution of global extreme point definition subprocess 800, a query task 808 is performed. At query task 808, a determination is made as to whether margin budget 146 can be met by any extreme point. Although the following tasks associated with margin budget 146 are described separately from global extreme point definition subprocess 800 for illustrative purposes, their execution may alternatively be embedded within subprocess 800 as the global extreme points are defined. When there are one or more global extreme points that meet margin budget, process control proceeds to a task 900 (discussed below). However, when there are no global extreme points that meet margin budget 146, program control proceeds to a task 810.

At task 810, the previously computed demand outcomes for products 600 at their current prices are utilized with the mix of products 600 and promotion choices 202. Typically, the profit-revenue first global frontier 1502 has points above the margin budget lower limit. If it does not, then even pure-profit promotion strategy 302 has insufficient margin to satisfy margin budget. If this is the situation, decisions cannot be made that lead toward an optimal promotion plan 128. Consequently, an alternative solution is found. This alternative solution will include a combination of products 600 and promotion combinations 200 and selectively utilize products that are held to their current prices.

In response to task 810, a task 812 is performed. At task 812, promotion optimization engine 116 finds global extreme points on the profit-X frontier where X=negative revenue.

A task 814 is performed in cooperation with task 812. At 814, a first extreme point is selected from the profit-X frontier that meets margin budget 146. The result of execution of tasks 810, 812, and 814 is generally illustrated below in connection with FIG. 21. Subsequent tasks in the flowchart of FIGS. 8-9 beginning with task 900 shall be discussed herein below, following discussion of FIG. 21.

FIG. 21

Figure 21:
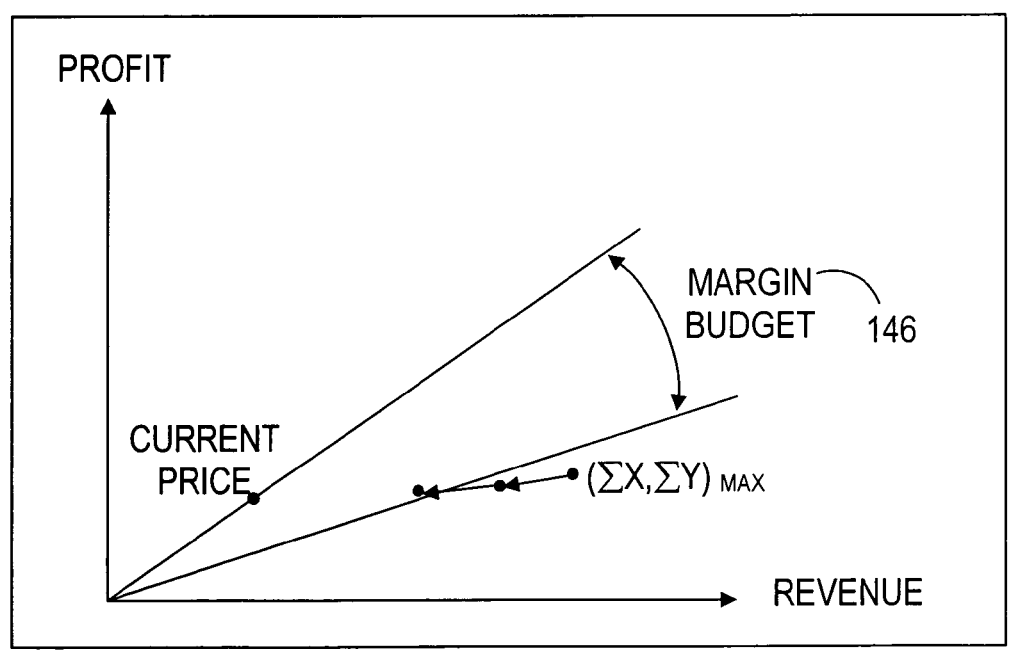
FIG. 21 shows a graph of an exemplary situation in which a solution does not meet a margin budget.

FIG. 21 shows a graph 2100 of an exemplary situation in which a solution does not meet margin budget 146. The top point of the profit-X frontier is maximum profit and the first point that meets (i.e. falls within) margin budget 146 requirement is the highest profit frontier option that is still feasible. There may be higher profit points inside the profit-negative revenue frontier, but this finds a feasible, profitable solution without having to search an astronomical number of combinations.

FIGS. 8-9 Continued

Referring back to enterprise-scale optimization subprocess 414, program control continues with task 900. At task 900, the global extreme points are utilized to resolve strategy solutions. Once the global extreme points on surface frontier 2002 are found, fifteen strategy solutions 300 are selected. Pure-profit strategy 302, pure-revenue strategy 304, and pure-unit sales strategy 306 can be readily ascertained. The maximum profit and maximum revenue can be found from first global frontier curve 1502 (a=0). Similarly, the maximum unit sales curve can be found from second global frontier curve 1902 (a=1).

It is possible that the maximum revenue solution is reached with margin to spare above margin budget 146, but typical problems reach margin budget 146 along second global frontier curve 1902 (a=1) before the revenue reaches its maximum. It is less likely that a maximum units solution will have margin to spare as any decrease in price will increase units and decrease margin. It is possible to have lower prices with lower unit sales if a lower promotional lift is available.

Once the pure strategy triangle with its three edges and slopes are found, intermediate strategy solutions can be determined for promotion strategies 300 by taking weighted averages of the profit, revenue, and unit sales of the pure-strategy solutions, i.e., pure-profit strategy 302, pure-revenue strategy 304, and pure-unit sales strategy 306. This intermediate strategy solution of extreme points on the frontier surface is then geometrically projected onto the plane of the strategy triangle of FIG. 3. Weighted average calculations can then be performed as discussed in connection with FIG. 3. In the space of the projected-to strategy triangle, a determination can be made as to which extreme point is geometrically closest to the weighted average. The result of execution of task 900 is generally illustrated below in connection with FIGS. 22-23. Subsequent tasks in the flowchart of FIGS. 8-9 shall be discussed herein below, following discussion of FIGS. 22-23.

FIGS. 22-23

Figure 22:
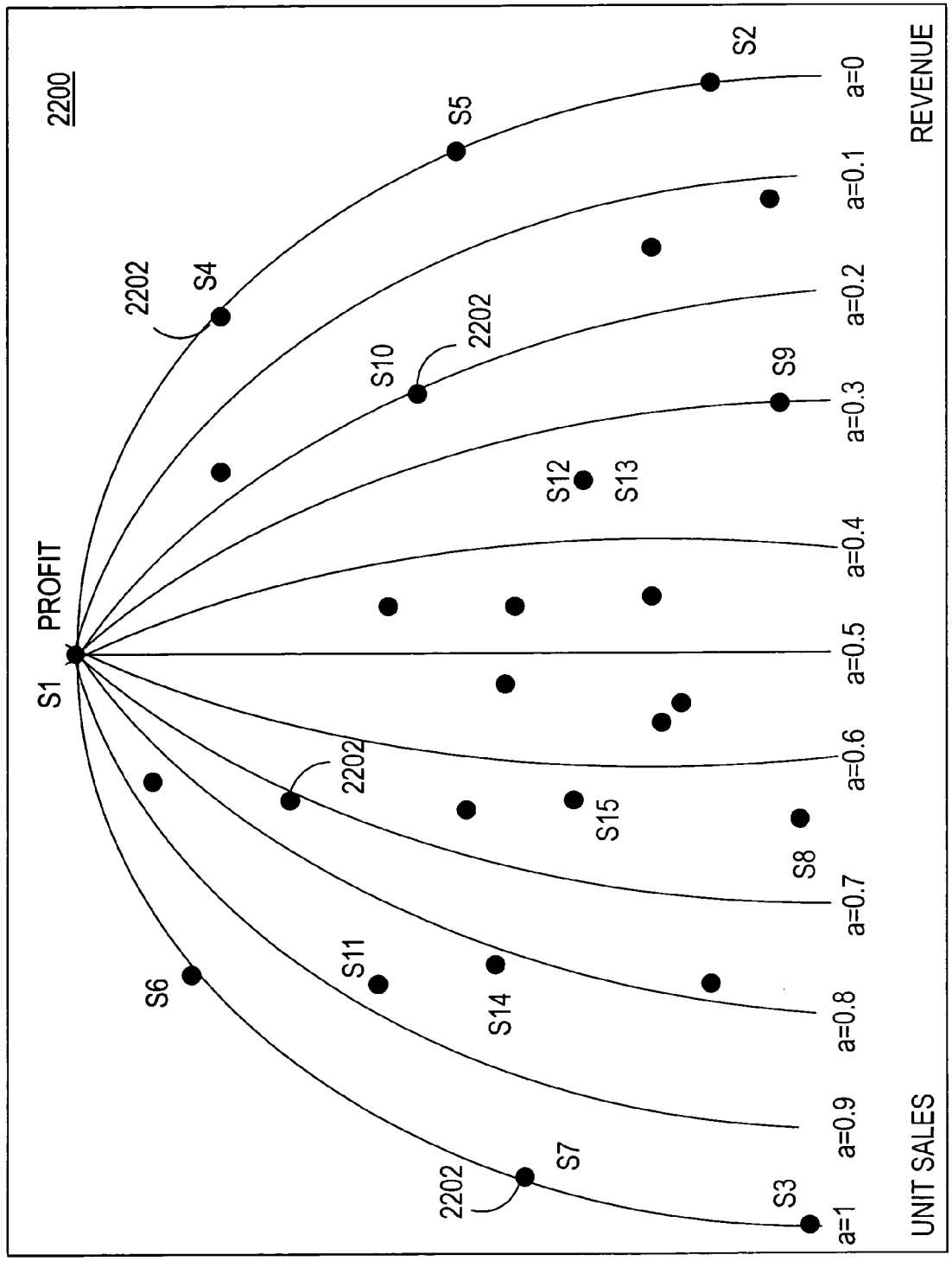
FIG. 22 shows a chart of global extreme points obtained through the execution of global extreme point definition subprocess 1200 that take into account three objectives of the enterprise.

FIG. 22 shows a chart 2200 of global extreme points 2202 obtained through the execution of global extreme point definition subprocess 1200 that take into account three objectives of the enterprise, i.e., profit, revenue, and unit sales. FIG. 23 shows a table 2300 of fifteen strategy solutions 2302, labeled S1 through S15, i.e., extreme points 2202 for each of promotion strategies 300 obtained from frontier surface 2002 of the three objectives of the enterprise.

Chart 2200 mimics the strategy triangle of FIG. 3, but includes the defined extreme points 2202 retained in global extreme points database 134. Table 2300 provides the X, Y, Z values, i.e. profit, revenue, and unit sales, for each of extreme points 2202 that are the selected strategy solutions 2302. Strategy nomenclature 2304 is provided in chart 2300 to provide correspondence with extreme points 2202 for ease of understanding, where "P" is profit, "R" is revenue, and "US" is unit sales. In addition, table 2300 provides a slope, $\lambda$, 2306 for each of strategy solutions 2302 and the trajectory, index "a" 2308 for each of strategy solutions 2302.

FIGS. 8-9 Continued

Referring back to enterprise-scale optimization subprocess 414, following task 900, program control continues with a task 902. At task 902, the consistency or reality of strategy solutions 2302 is verified. Sometimes, the nearest points to the weighted average values are far enough away from their ideal locations that the objectives (profit, revenue, unit sales) come out in the wrong order. This can happen when a promotion event has products with similar demand characteristics and few offer 204 and price rule 206 options. Consequently, there is a small selection of optimization choices. When, for example, a revenue-profit optimization comes out with less profit than a pure-revenue optimization, this inconsistency may be resolved by setting both strategies' solutions to the pure-revenue value.

A query task 904 is performed in connection with task 1302. At task 904, a determination is made as to whether each of strategy solutions 2302 is consistent with the other strategy solutions 2302. When any of strategy solutions 2302 is inconsistent, process control proceeds to a task 906.

At task 906, for any inconsistent strategy solutions 2302, another strategy solution 2302 is selected. Process control then proceeds to a task 908 where all strategy solutions 2302 are saved. However, when all of strategy solutions 2302 are determined to be consistent at task 904, process control proceeds directly to task 908 to save all strategy solutions 2302. An exemplary consistency check table may be utilized during the execution of tasks 902, 904, 906, and 908 and is generally illustrated below in connection with FIG. 24. Subsequent tasks in the flowchart of FIGS. 8-9 shall be discussed herein below, following discussion of FIG. 24.

FIG. 24

FIG. 24 shows a table 2400 utilized to test the consistency of strategy solutions 2302. Once strategy solutions 2302 have been found for all fifteen promotion strategies 300, table 2400 is reviewed. If a first strategy solution 2402 is less than a second strategy solution 2404 in the test value dimension 2406 than first strategy solution 2402 is replaced by second strategy solution 2404.

By way of example, reviewing a first line of table 2400, delineated by dashed lines 2408, the profit P of the revenue-profit, R-P, first strategy solution 2402 is compared with the pure revenue, R, second strategy solution 2404. The profit P of the revenue profit first strategy solution 2402 is compared with test value 2406 of profit, P. Test value 2406 represent the profit, P, of the pure revenue, R, second strategy solution 2404. The expectation is that the profit P of the revenue-profit, R-P, first strategy solution 2402 should be greater than profit, P, test value 2406 because R-P first strategy solution 2402 has profit built into it and R second strategy solution 2404 does not. There are circumstances where the optimization's nearest point search comes up with solutions where profit, P, of R-P first strategy solution 2402 is less than profit, P, test value 2406 for R second strategy solution 2404. When such an instance occurs, R-P first strategy solution 2402 is replaced with R second strategy solution 2404 to resolve the inconsistency. Since all fifteen strategy solutions 2302 have been generated, inconsistencies in all fifteen strategy solutions may be resolved.

FIGS. 8-9 Continued

Referring back to enterprise-scale optimization subprocess 414, following task 908, program control continues with a task 910.

At task 910, for the one of strategy solutions 2302 corresponding to the user selected promotion strategy 144, one of promotion choices 202 (combination of offer 204 and price rule 206) is selected for each of products 600 or subset of products 600. Selection of promotion choices 202 is determined by finding those promotion choices 202 that maximize the one of strategy solutions 2302. An exemplary linear objective function may be maxf=$\lambda((1-a)\text{revenue}+a(\text{units}))+(1-\lambda)$ profit, where $\lambda$ is slope 2306 and "a" is the trajectory, index "a" 2308 found in table 2300 for the selected strategy solution. Thus, slope 2306 and index 2308 serve as a guideline for independently obtaining one of promotion choices (offer 204 and price rule 206) for each of products 600.

Following task 910, a query task 912 is performed. Query task 912 determines whether promotion optimization engine 116 is to select a subset of products 600 for a promotion event. When the user has previously selected an optimization mode in which the user selects which products 600 are to be promoted during a promotion event, program control proceeds to a query task 914, discussed below. However, when the user has previously selected an optimization mode in which optimization engine 116 is to select products 600 for promotion, process control proceeds to a task query task 915.

At query task 915, a determination is made as to whether a subset of products 600 has already been selected by promotion optimization engine 116. When a subset of products 600 was previously chosen by engine 116, process control proceeds to task 914, discussed below. However, when promotion optimization engine 116 has not yet selected a subset of products 600 for a promotion event, process control proceeds to a task 916.

At task 916, optimization engine 116 selects a subset of products 600 for promotion. By way of example, for each of the fifteen strategy solutions 2302, those products 600 and promotion choices 202 that contribute the most toward the linear objective function whose optimum is extreme point 2202 (found at task 910) are selected. Once a subset of products 600 and promotion choices 202 is selected for each of the fifteen strategy solutions 2302, enterprise-scale optimization subprocess 414 returns to task 800 to repeat the execution of subprocess 414 for the selected subset of products 600 to ultimately select, for each of the subset of products, a promotion choice that optimizes a user defined promotion strategy 144. Thus, the processing of query tasks 912 and 915, allows optimization engine 116 to either select only promotion choices 202 (i.e., offers 204 and specific price rules 206) for a user-defined list of products or allows optimization engine 116 to select both a subset of products 600 and promotion choices 202 for the selected subset of products 600.

As mentioned above, when optimization engine 116 is not to select a subset of products 600 at query task 912 or when a subset of products 600 was previously selected by optimization engine 116 at query task 915, process control proceeds to task 914. At task 914, promotion plan 128 is constructed. Promotion plan 128 contains decisions, in the form of product/promotion choice list 154, for one of strategy solutions 2302 in accordance the user selected promotion strategy 144 and constrained by margin budget 146. Following task 914, enterprise-scale optimization subprocess 414 exits. Of course, it should be recalled that enterprise-scale optimization subprocess 414 is a subset of promotion plan provision process 400. Consequently, demand may be forecast in response to promotion plan 128, and promotion plan 128 may ultimately be accepted or rejected as described above in connection with promotion plan provision process 400.

In summary, the present invention teaches of a system and method for optimization of a promotion plan to be implemented during a promotion event. The system and method can accomplish enterprise-scale optimization to arrive at an optimal promotion plan within reasonable computer processing time limits. In particular, the present invention leverages large and complex optimization from small scatterings of options for each product. These small scatterings can be readily aggregated to find global maximums. Moreover, promotion and pricing decisions can be made based on a relative weight of realizing one or more objectives of the enterprise through finding global maximums on a three-dimensional frontier surface.

Although the preferred embodiments of the invention have been illustrated and described in detail, it will be readily apparent to those skilled in the art that various modifications may be made therein without departing from the spirit of the invention or from the scope of the appended claims. For example, those skilled in the art will appreciate that the tasks depicted in above flowcharts may be partitioned and sequenced in a wide variety of ways other than those specifically described herein.

What is claimed is:

1. A computer-implemented method of providing a promotion plan for merchandising of products for sale by an enterprise comprising:
    receiving base data for said products, said base data including allowable offers for said products and price rules that affect said offers;
    establishing, by a processor, a margin budget for said promotion plan, said margin budget defining an amount of margin, relative to a non-promotion price, said enterprise is willing to forgo for a promotion event implementing said promotion plan and is equal to a margin at said non-promotion price minus a margin at a promotion price;
    generating, by a processor, a scenario for said promotion plan in response to said base data;
    optimizing, by the processor, said scenario to resolve a strategy solution for said promotion plan that includes three objectives of said enterprise to obtain decisions for said promotion plan in accordance with said promotion strategy, said decisions being constrained by said margin budget and said optimizing comprises:
        for said each of said products, identifying promotion choices of said allowable offers as affected by said price rules;
        modeling market demand for said each of said products to receive demand outcomes responsive to said promotion choices; and
        utilizing said demand outcomes to obtain said decisions;
        identifying extreme points for said each of said products from said demand outcomes;
        finding first global extreme points for all of said products from said extreme points, said first global extreme points characterizing a trade-off between realizing a first and second one of objectives;
        finding second global extreme points for all of said products from said extreme points, said second global extreme points characterizing a trade-off between realizing said first objective and a third one of objectives;
        finding intermediate global extreme points between said first and second global extreme points that characterize a trade-off between realizing said first, second, and third objectives; and
        employing said first, second, and intermediate global extreme points in optimizing said scenario; and
    presenting, by the processor, said promotion plan indicating said obtained decisions for implementation by said enterprise during said promotion event, said obtained decisions including a list of said products, each of said products in said list being associated with one of said offers and one of said price rules.

2. A method as claimed in claim 1 wherein said generating operation comprises:
    selecting a portion of said products for potential inclusion in said promotion plan; and
    said optimizing operation utilizing said portion of said products to yield said promotion plan indicating said obtained decisions for said portion of said products.

3. A method as claimed in claim 1 wherein said enterprise includes a plurality of stores, and said generating operation comprises selecting a portion of said plurality of stores for implementation of said promotion plan.

4. A method as claimed in claim 3 wherein each of said portion of said stores markets said products in said list at a store specific regular price, and said method further comprises adjusting, at each of said portion of said stores, said store specific regular price of said products in said list to a promotion price in accordance with said associated one offer and said one price rule.

5. A method as claimed in claim 1 wherein said generating operation comprises defining a promotion strategy for said promotion event.

6. A method as claimed in claim 1 wherein said defining operation comprises:
    identifying objectives of said enterprise; and
    combining said objectives to form said promotion strategy.

7. A method as claimed in claim 6 wherein:
    said combining operation establishes a hierarchy of said objectives; and
    said optimizing operation obtains said decisions in accordance with said hierarchy.

8. A method as claimed in claim 1 wherein said finding operation comprises:
    selecting an optimal demand outcome for said each of said products from said demand outcomes, said optimal demand outcome optimizing an objective of said enterprise;
    combining said extreme points associated with said optimal demand outcome for said each of said products to obtain a first one of said global extreme points.

9. A method as claimed in claim 8 further comprising:
    establishing a frontier of said global extreme points that extends from said first global extreme point; and
    restricting a set of said global extreme points in said frontier by a lower limit of said margin budget.

10. A method as claimed in claim 1 wherein said utilizing operation comprises:
    defining a frontier from said demand outcomes for said products, said frontier being constrained by said budget margin;
    choosing an extreme point on said frontier that most closely corresponds to a predetermined promotion strategy for said promotion event; and
    ascertaining from said extreme point a guideline for independently obtaining said one of said offers and said one of said price rules for said each of said products in said promotion plan.

11. A method as claimed in claim 1 further comprising:
    determining, in response to said optimizing operation, an inability to obtain said decisions within said margin budget;
    receiving current prices for said products; and
    repeating said optimizing operation for said scenario utilizing said base data of allowable offers for said products and said price rules and selectively utilizing said current prices for said products to obtain said decisions that are within said margin budget, said decisions including said list of said products wherein a subset of said products in said list are associated with corresponding ones of said regular prices.

12. A method as claimed in claim 1 further comprising modeling market demand for said each of said products in said list following said optimizing operation.

13. A method as claimed in claim 12 wherein said enterprise includes a plurality of stores, each of said stores markets said products in said list at store specific regular prices, and said method further comprises:
computing, for each of said stores, promotion prices for said products in accordance with said associated offers and said price rules relative to said store specific regular prices; and
performing said modeling operation to forecast demand of said products at said each of said stores during said promotion event.

14. A system for providing a promotion plan for merchandising of products for sale by an enterprise comprising:
an input for receiving base data for said products, a margin budget, and a promotion strategy from a user, said base data including allowable offers for said products and price rules that affect said offers, said margin budget defining an amount of margin, relative to a non-promotion price, said enterprise is willing to forgo for a promotion event implementing said promotion plan and is equal to a margin at said non-promotion price minus a margin at a promotion price;
a scenario generator in communication with said input for acquiring said base data, said budget margin, and said promotion strategy to generate a scenario for said promotion plan;
an optimization engine, in communication with said scenario generator, configured to identify promotion choices of said allowable offers as affected by said price rules, model market demand for said each of said products to receive demand outcomes responsive to said promotion choices, utilize said demand outcomes to resolve a strategy solution for said promotion plan that includes three objectives of said enterprise to obtain decisions for said promotion plan in accordance with said promotion strategy with said decisions being constrained by said margin budget, identifying extreme points for said each of said products from said demand outcomes; find first global extreme points for all of said products from said extreme points, said first global extreme points characterizing a trade-off between realizing a first and second one of objectives, find second global extreme points for all of said products from said extreme points, said second global extreme points characterizing a trade-off between realizing said first objective and a third one of objectives, find intermediate global extreme points between said first and second global extreme points that characterize a trade-off between realizing said first, second, and third objectives; and employing said first, second, and intermediate global extreme points in optimizing said scenario;
an output for presenting said promotion plan indicating said obtained decisions for implementation by said enterprise during said promotion event, said obtained decisions including a list of said products, each of said products in said list being associated with one of said offers and one of said price rules; and
a processor in communication with said scenario generator and said optimization engine to execute said scenario generator and said optimization engine.

15. A system as claimed in claim 14 wherein said optimization engine is configured to obtain said decisions in accordance with a hierarchy of objectives of said enterprise, said objectives forming said promotion strategy.

16. A system as claimed in claim 14 wherein said optimization engine is configured to define a frontier from said demand outcomes for said products, said frontier being constrained by said budget margin, said optimization engine is further configured to choose an extreme point on said frontier that most closely corresponds to said promotion strategy and ascertain from said extreme point a guideline for independently obtaining said one of said offers and said one of said price rules for said each of said products in said promotion plan.

17. A system as claimed in claim 14 wherein said optimization engine is configured to model market demand for said each of said products in said list following said optimizing operation.

18. A system as claimed in claim 14 further comprising receiving a defined promotion strategy for said promotion event.

19. A non-transitory computer-readable storage medium storing computer executable code thereon to provide a promotion plan for merchandising of products for sale by an enterprise, the medium comprising:
a library of base data for said products, said base data including allowable offers for said products and price rules that affect said offers; and
executable code for instructing a processor to create said promotion plan, said executable code instructing said processor to perform operations comprising:
establishing a margin budget for said promotion plan, said margin budget defining an amount of margin, relative to a non-promotion price, said enterprise is willing to forgo for a promotion event implementing said promotion plan and is equal to a margin at said non-promotion price minus a margin at a promotion price;
generating a scenario for said promotion plan in response to said base data;
optimizing said scenario to resolve a strategy solution for said promotion plan that includes three objectives of said enterprise to obtain decisions for said promotion plan in accordance with said promotion strategy, said decisions being constrained by said margin budget, said optimizing comprising:
for said each of said products, identifying promotion choices of said allowable offers as affected by said price rules;
modeling market demand for said each of said products to receive demand outcomes responsive to said promotion choices; and
utilizing said demand outcomes to obtain said decisions;
identifying extreme points for said each of said products from said demand outcomes;
finding first global extreme points for all of said products from said extreme points, said first global extreme points characterizing a trade-off between realizing a first and second one of objectives;
finding second global extreme points for all of said products from said extreme points, said second global extreme points characterizing a trade-off between realizing said first objective and a third one of objectives;
finding intermediate global extreme points between said first and second global extreme points that characterize a trade-off between realizing said first, second, and third objectives; and
employing said first, second, and intermediate global extreme points in optimizing said scenario; and
presenting said promotion plan indicating said obtained decisions for implementation by said enterprise during said promotion event, said obtained decisions including a list of said products, each of said products in said list being associated with one of said offers and one of said price rules.

20. A non-transitory computer-readable storage medium as claimed in claim 19 wherein said executable code instructs said processor to perform operations of said utilizing operation comprising:
- identifying extreme points for said each of said products from said demand outcomes; and
- finding global extreme points for all of said products from said extreme points, said global extreme points characterizing a trade-off between realizing a first one and a second one of said objectives, said finding operation including:
- selecting an optimal demand outcome for said each of said products from said demand outcomes, said optimal demand outcome optimizing an objective of said enterprise;
- combining said extreme points associated with said optimal demand outcome for said each of said products to obtain a first one of said global extreme points;
- establishing a frontier of said global extreme points that extends from said first global extreme point; and
- restricting a set of said global extreme points in said frontier by a lower limit of said margin budget; and
- employing said set of said global extreme points in optimizing said scenario.

21. A non-transitory computer-readable storage medium as claimed in claim 19 wherein said executable code instructs said processor to perform operations comprising:
- determining, in response to said optimizing operation, an inability to obtain said decisions within said margin budget;
- receiving current prices for said products; and
- repeating said optimizing operation for said scenario utilizing said base data of allowable offers for said products and said price rules and selectively utilizing said current prices for said products to obtain said decisions that are within said margin budget, said decisions including said list of said products wherein a subset of said products in said list are associated with corresponding ones of said regular prices.

22. A non-transitory computer-readable storage medium as claimed in claim 19 further comprising executable code for instructing said processor to define a promotion strategy for said promotion event.

* * * * *